United States Patent [19]
Ohki et al.

[11] Patent Number: 5,952,639
[45] Date of Patent: *Sep. 14, 1999

[54] DEPOSITING, WITHDRAWAL, BALANCE CHECK, EXCHANGE AND TRANSFER OF ELECTRONIC MONEY IN AUTOMATIC CASH HANDLING MACHINE

[75] Inventors: Masayuki Ohki; Atsuhiko Urushihara; Jun Furuya, all of Kokubunji; Hiroki Kitagawa, Tokyo; Takao Oosawa, Niiza, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,749

[22] Filed: Dec. 5, 1996

[30] Foreign Application Priority Data

Dec. 8, 1995 [JP] Japan .................................. 7-320667

[51] Int. Cl.[6] ........................... G06K 17/00; G06K 17/60
[52] U.S. Cl. ........................ 235/379; 235/375; 235/380; 235/382; 235/492; 902/4; 902/5; 902/8; 902/25; 902/26
[58] Field of Search ..................................... 235/375, 379, 235/380, 382, 492; 902/4, 5, 8, 25, 26

[56] References Cited

U.S. PATENT DOCUMENTS

| | | | |
|---|---|---|---|
| 3,648,020 | 3/1972 | Taeeisi et al. | 235/61.7 |
| 3,778,595 | 12/1973 | Hatanaka et al. | 235/61.7 |
| 4,454,414 | 6/1984 | Benton | 235/379 |
| 4,709,136 | 11/1987 | Watanabe | 235/379 |
| 4,736,094 | 4/1988 | Yoshida | 235/380 |
| 4,745,265 | 5/1988 | Douno et al. | 235/380 |
| 4,900,903 | 2/1990 | Wright et al. | 235/380 |
| 5,064,999 | 11/1991 | Okamoto et al. | 235/379 |
| 5,093,862 | 3/1992 | Scwartz | 235/380 |
| 5,175,416 | 12/1992 | Mansvelt et al. | 235/379 |
| 5,453,601 | 9/1995 | Rosen | 235/379 |
| 5,691,525 | 11/1997 | Aoki et al. | 235/379 |
| 5,696,908 | 12/1997 | Muehlberger et al. | 235/380 |

FOREIGN PATENT DOCUMENTS

| | | |
|---|---|---|
| 6-162059 | 6/1994 | Japan . |
| 7-192064 | 7/1995 | Japan . |
| 7-334590 | 12/1995 | Japan . |

*Primary Examiner*—Thien Minh Le
*Attorney, Agent, or Firm*—Fay, Sharpe, Beall, Fagan, Minnich & McKee

[57] ABSTRACT

An electronic-money card is used for carrying out transactions such as depositing, drawing, cash exchanging and transfers of electronic money in an automatic teller machine. A plurality of menus showing a variety of transactions are displayed so that the user to select one of the menus. If the deposit menu is selected, menus for cash and electronic money are displayed to request the user to select whether the money to be deposited is cash or electronic money. If the user selects the electronic-money deposit menu, the user is requested to enter a cash card and a password number. Once the password number is entered, the validity of the user is verified. After the validity of the user has been verified, the user is requested to enter an IC card and to specify the amount of electronic money to be deposited. Electronic money of the specified amount is drawn from the IC card and deposited in an account of the user by transferring the drawn electronic money to an electronic value box in a bank business system by way of a communication line. Thus, the transaction to deposit electronic money can be carried out in combination with a cash card in an automatic teller machine.

18 Claims, 12 Drawing Sheets

DEPOSITING, WITHDRAWAL, BALANCE CHECK, EXCHANGE AND TRANSFER OF ELECTRONIC MONEY IN AUTOMATIC CASH HANDLING MACHINE

BACKGROUND OF THE INVENTION

The present invention relates to a method of handling electronic money for carrying out at least one of transaction such as depositing, drawing, cash exchanging and transfers by using a card holding electronic money in an automatic cash handling machine or an automatic cash transaction machine.

A system which allows the use of electronic money instead of cash is proposed. With this system, money spent in shopping is paid electronically. Unlike cash, since no change is returned to the payer, the shop does not have to prepare change money in advance and there will be no mistake in the calculation or in the delivery of change. As a result, in comparison with cash payment, electronic money is convenient for both the customer and the shop, allowing easier shopping.

Electronic-cash systems include a 'Mondex system' proposed by Mondex International, a British company, and 'Ecash' proposed by DigiCash B. V., a Dutch company. Other systems have also been proposed but these other systems are different from the credit system. In these other systems, first of all, electronic money equivalent to cash is prepared then payment is made from the prepared electronic money. Electronic money is prepared typically by drawing money from a bank and receiving the drawn money in an electronic cash card. Electronic money can be drawn from a bank in the same way as cash.

As an electronic cash card for receiving electronic money, among other cards, a card including an IC (integrated-circuit) has drawn much attention recently. Preferred embodiments using such a card are explained in this specification. It should be noted, however, that the scope of the present invention is not limited to use of such a card. Such a card for receiving electronic money is referred to hereafter as an electronic-money integrated-circuit card, an electronic-money IC card or merely an IC card. Such an electronic-money integrated-circuit card and other electronic-money cards are generically referred to merely as an electronic-money card.

It is required that an electronic-money card has a function for preventing fraudulent transactions. For this reason, an electronic-money IC card typically comprises a microprocessor with a communication function, and a memory such as an EEPROM unit for storing a processing program and an electronic-money balance remaining in the electronic-money IC card. In order to prevent fraudulent transactions, a system including a special IC is provided so as to make it impossible to make a change to the electronic-money balance remaining in the electronic-money IC card. In the case of the "Mondex system" for example, delivery of electronic money can be carried out only among IC cards in order to prevent abuse.

SUMMARY OF THE INVENTION

The proposed electronic-money system described above is still at a stage of development at which the functions and configuration components composing the system are not determined yet.

The systems which will employ electronic money have various problems to be solved. Abrupt change in social life will introduce a lot of confusion. Economic activity using cash has merits as well as demerits in comparison with economic activity using electronic money. Therefore, it is unlikely that cash will be replaced by electronic money at once. Economic activity is expected to continue which will use cash and electronic money together, so as to make use of their merits. As a result, the users will use cash and electronic money together. It will be inconvenient, if the users will be obliged to use cash by a handling machine which can handle only cash and to use electronic money by a handling machine which can handle only electronic money. It is necessary to enable electronic money to be handled in an automatic cash handling machine.

It is thus an object of the present invention to provide a method of handling electronic money for carrying out at least one function referred to hereafter as a transaction such as depositing money, drawing money, exchanging money and transferring money using electronic money in a machine such as a cash dispenser for drawing money from a bank account, a cash depository for depositing money into a bank account or an automatic teller machine which has both the functions of drawing and depositing money from or into a bank account. These machines will be called as an automatic cash handling machine or an automatic cash transaction machine, when all these machines are generally called.

It is a more concrete object of the present invention to provide a method used in an automatic cash handling machine which allows the user to select the use of either a cash card for handling cash or an IC card for handling electronic money.

In order to achieve the objects described above, the present invention provides a method to draw cash from a specified bank account comprising the step of specifying the amount of money to be drawn. A transaction to draw money and put it in an electronic-money card for holding electronic money comprises the step of inserting the electronic-money card and the step of specifying the amount of money to be drawn.

More specifically, the method also includes the step of selecting whether the money to be drawn is cash or electronic money.

Even more specifically, prior to the execution of the steps described above, a plurality of menus representing a plurality of transaction items including the transaction to draw money are displayed in order to request the user to select one of the transaction items. As described above, the menus include a menu of drawing money provided in common to drawing money by cash and drawing money by electronic money. If the transaction to draw money is selected among the transaction items described above, the aforementioned selecting step is executed.

DETAILED DESCRIPTION OF THE PREFERRED EMBODIMENTS

Figure 1:
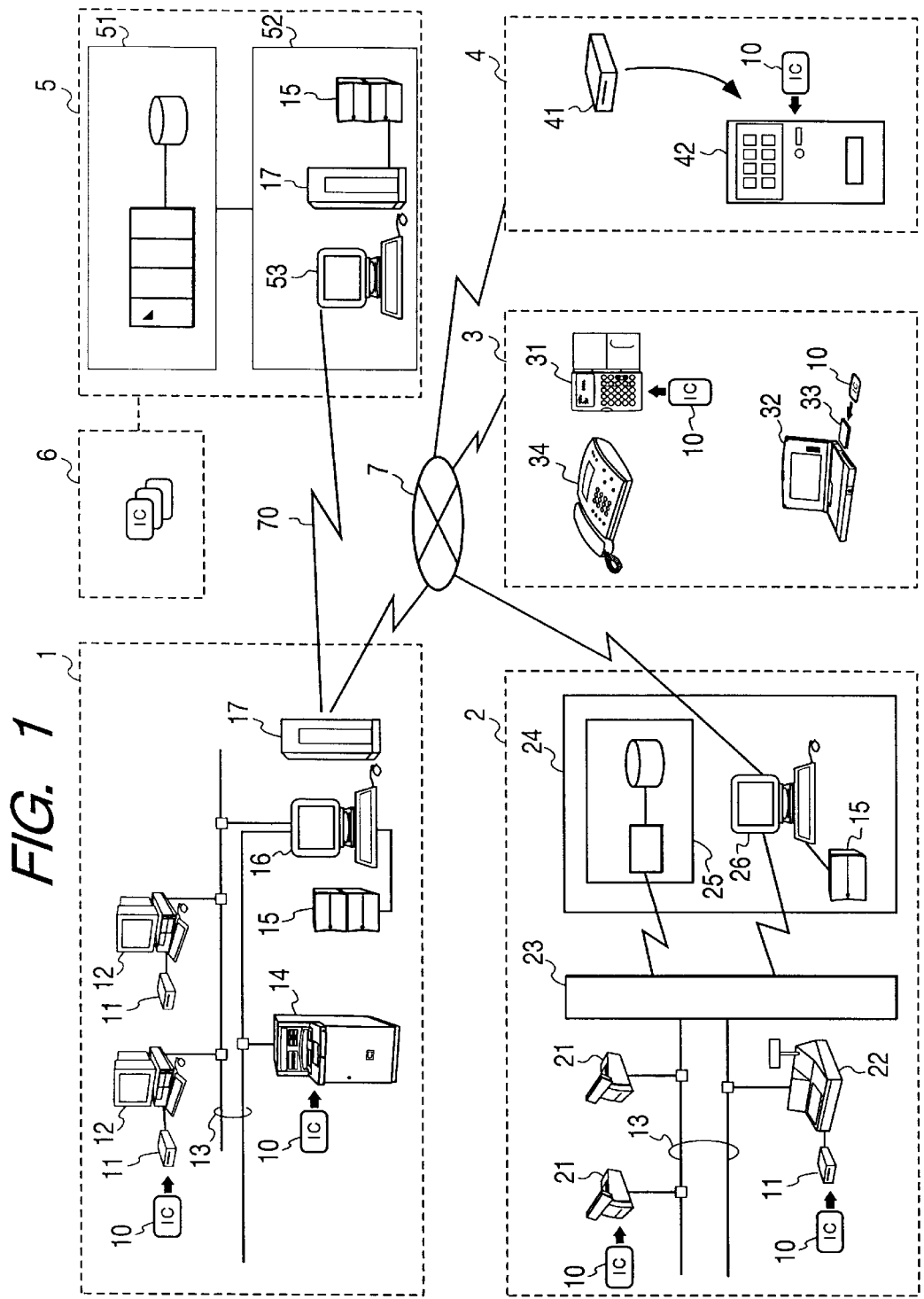
FIG. 1 is a schematic block diagram showing an electronic-money system employing an automatic teller machine provided according to the present embodiment.

The present invention will become more apparent from the following detailed description of some preferred embodiments with reference to accompanying diagrams showing the embodiments. It should be noted that, in the case of the second embodiment, only differences from a first embodiment are explained. In addition, the same reference numeral denotes a similar or identical element.

<First Embodiment>

(A) Overview of Electronic-Money System

An electronic-money system shown in FIG. 1 comprises, among other components, a bank branch system 1, a retail-store system 2 installed at a large store such as a department store and a supermarket, a personal computer 32 serving as a public-user system 3, an IC-card telephone 34 and a dispenser system 4 which are connected to each other by way of a public telephone line 7. In the electronic-money system shown in the figure, only one sub-system of each component is shown. In actuality, however, a number of sub-systems can be connected by way of the public telephone line 7 to form the electronic-money system. In addition, the bank branch system 1 is connected to a bank computing center 5 by a dedicated line 70 or the like. An originator 6 is connected to the bank computing center 5.

Figure 3:
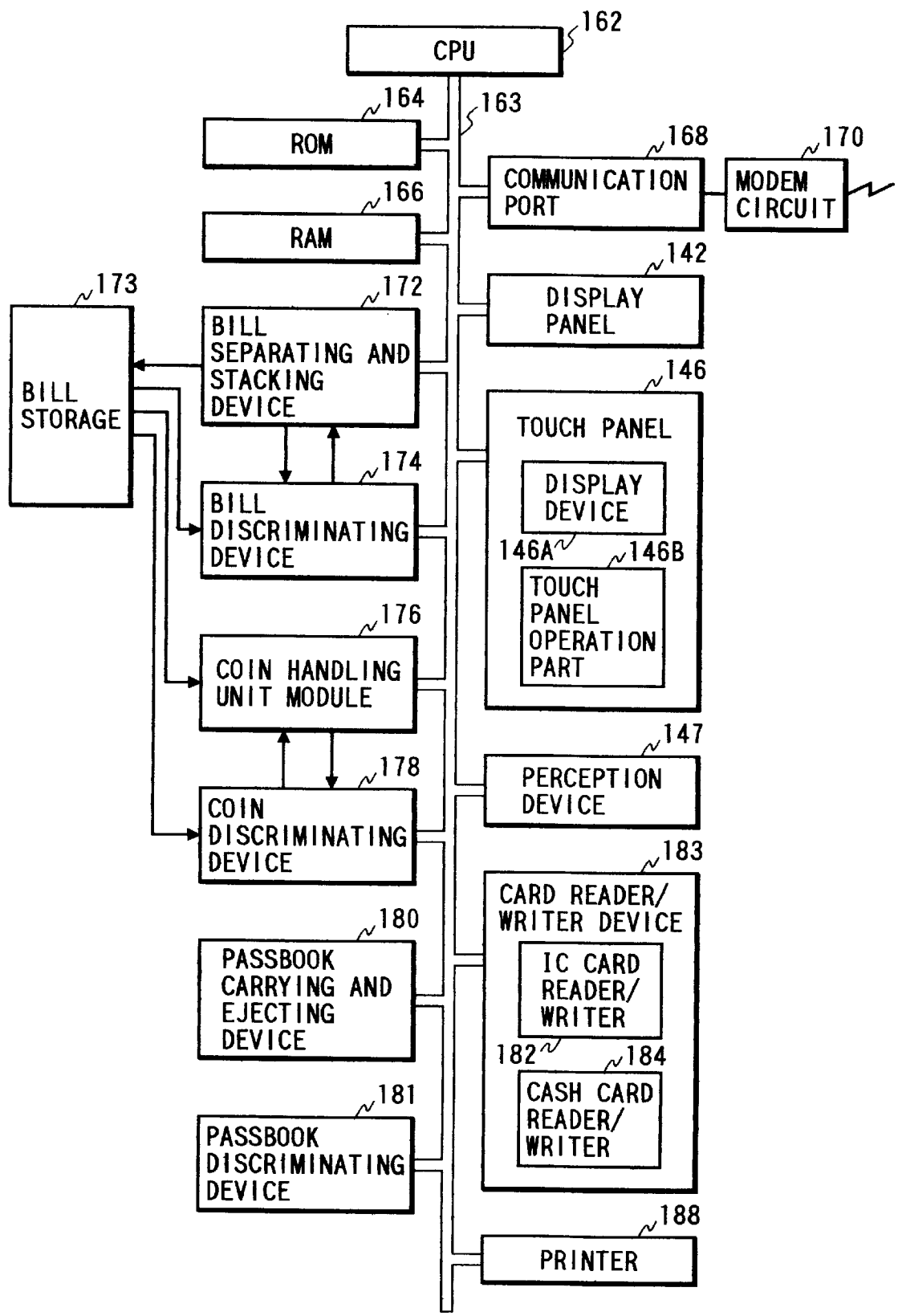
FIG. 3 is a schematic block diagram showing the interior of the automatic teller machine shown in FIG. 2.

In the bank branch system 1, banking teller terminals 13 are connected to an automatic teller machine 14 by way of an internal communication line 12. The banking teller terminals 12 and the automatic teller machine 14 are connected to the bank computing center 5 by way of a relay computer 17. An IC-card reader/writer 11 is provided for each of the banking teller terminals 12 for the purpose of electronic-money settlement. An IC-card reader/writer system 182 shown in FIG. 3 is embedded in the automatic teller machine 14. The banking teller terminals 12 and the automatic teller machine 14 are connected to an electronic value box 15 by way of an electronic-money transaction management terminal 16.

The bank computing center 5 comprises an accounting system host 51 and an external-connection system 52 which comprises an external management terminal 53, a relay computer 17 and an electronic value box 15.

IC cards 10 issued by the originator 6 are distributed to banks, stores, dispensers, individuals and other users participating in the electronic-money system. A bank accepts electronic money to be exchanged with cash in normal circulation and stores the electronic money in the electronic value box 15 provided in the external-connection system 52. The electronic value box 15 is used for storing a number of IC cards 10 each of which contain electronic money received from the originator 6. The electronic money contained in the IC cards 10 stored in the electronic value box 15 of the external-connection system 52 is further distributed to IC cards 10 stored in the electronic value box 15 of the bank branch system 1 installed in each bank branch.

An individual who participates in the electronic-money system as an end user has an IC card 10 given to the individual. The individual can draw money saved in the bank account of the individual and exchange the drawn money with electronic money which is then received in the IC card 10 by means of the automatic teller machine 14.

When the individual draws money as electronic money as described above, the IC card 10 owned by the individual is connected to an IC card 10 stored in the electronic value box 15 of the bank branch system 1 by way of the automatic teller machine 14. Then under control carried out by the electronic-money transaction management terminal 16, electronic money contained in the IC card 10 stored in the electronic value box 15 of the bank branch system 1 is transferred to the IC card 10 owned by the individual. At that time, the balance of the electronic money contained in the IC card 10 stored in the electronic value box 15 of the bank branch system 1 is decreased by the amount transferred to the IC card 10 owned by the individual. In the present embodiment, a cash card is also used in a transaction to draw the money. In the case of a second embodiment to be described later, it is not necessary to use such a cash card. In addition, a cash card is used for drawing cash from money saved in the account of the individual by means of the automatic teller machine 14 in the same way as the traditional transaction to draw money.

(B) Automatic Teller Machine 14

Figure 2:
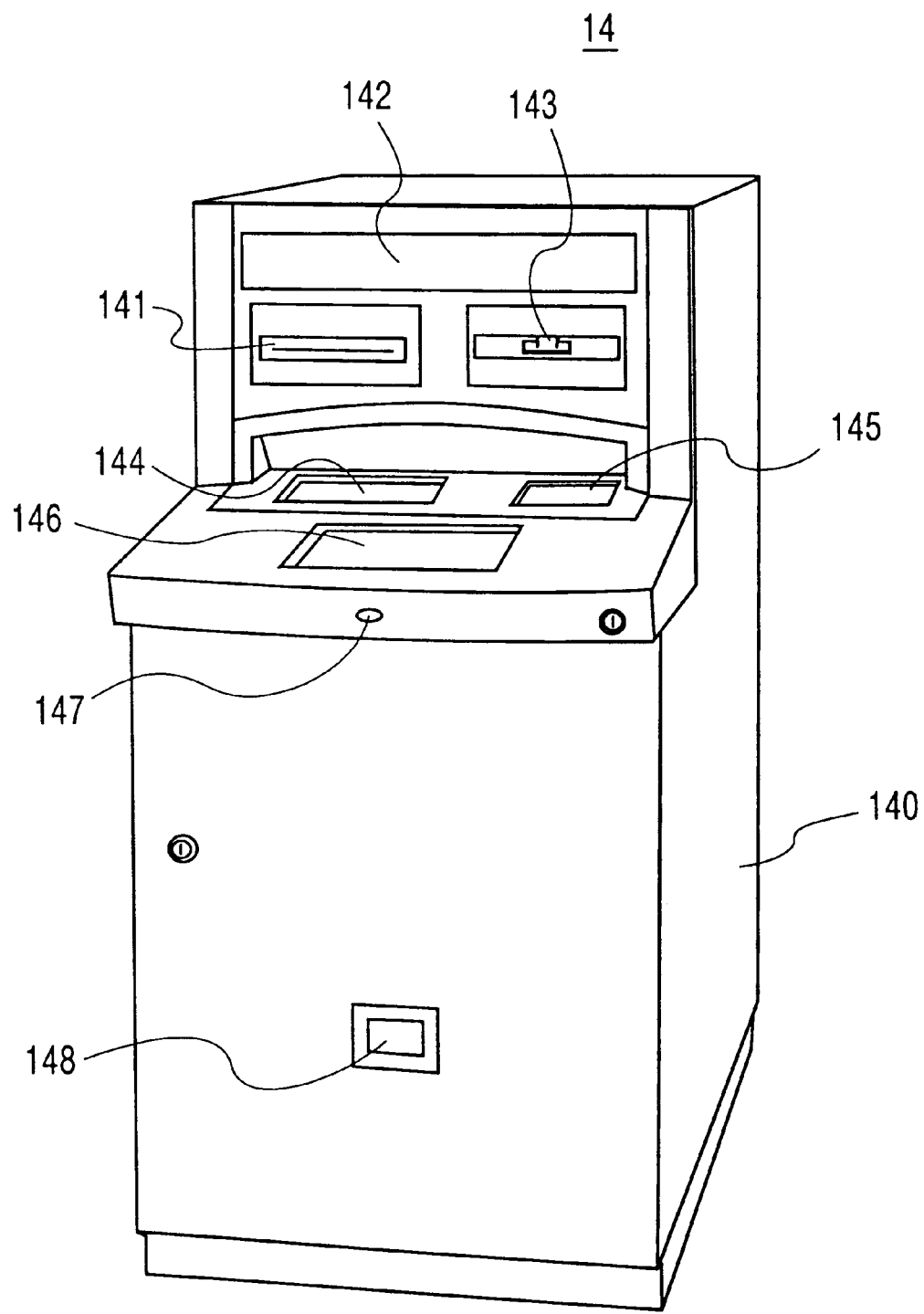
FIG. 2 is a perspective view showing a first embodiment of the present invention implementing the automatic teller machine employed in the electronic-cash system shown in FIG. 1.

As shown in FIG. 2, the automatic teller machine 14 comprises a bank passbook insert window 141 for inserting a bank passbook or the like, a display panel 142 for displaying information on the bank branch office, cash cards, transfer cards, a card insert window 143 for inserting IC cards containing electronic money and other cards, a bill acceptance and dispense module 144, a coin acceptance and dispense module 145, a touch panel operation unit 146A for giving necessary processing instructions to the user, a perception device 147 for detecting an approaching user and setting the automatic teller machine 14 in a usable state and a wrong-coin ejecting mouth/receiving lip 148 which are accommodated in a cabinet 140. The wrong-coin ejecting mouth/receiving lip 148 is used for ejecting a coin inserted mistakenly, an unknown coin and other coins by way of a mouth thereof and receiving the ejected coin on a lip below the mouth.

The detailed structure of the automatic teller machine 14 is shown in FIG. 3. As shown in the figure, connected to a microprocessor 162 for carrying out control operations by way of a bus 163 are a ROM unit 164 and a RAM unit 166 and a number of circuits and devices to be explained below. The automatic teller machine 14 has a feature that an IC-card reader/writer 182 shown in FIG. 5 for reading the contents of an IC card 10 and writing information thereto is provided in a card reader/writer unit 183 and in that a program for controlling operations of a variety of devices and circuits composing the automatic teller machine 14 is stored in the ROM unit 164. As will be described later, the operations are controlled in order to execute transactions using cash and IC cards.

At the present time, electronic-cash cards having a variety of structures have been proposed. For the bank account of the user, in particular, the card may have a bank identification number and/or an account number or the another card may be used. In economic activity which uses cash and electronic money together, it will be necessary to withdraw money and receive it as electronic money from an account different from one for which a bank identification number and a bank account number are stored in an electronic money card. An example of such a different account will be a bank account handled by a conventional cash card. It will be also necessary to deposit electronic money in the bank account, on the contrary. The present embodiment also has a feature that the conventional cash card can also be used for entering a bank identification number and an account number in the cases mentioned above.

A touch panel 146 is used by the user for entering information by specifying a position on a display screen 146A thereof. The touch panel 146 comprises a display unit 146A, typically implemented by a CRT, and the touch-panel operation unit 146B provided on the surface thereof for detecting a position on the display unit 146A specified by the by pressing the position or the like. The CPU 162 displays guidance information for the user or a plurality of menus and buttons to be selected by the user to the display unit 146A by executing a program stored in the ROM unit 164. When the user specifies the position of a displayed menu or button through the touch-panel operation unit 146B, the touch-panel operation unit 146B detects the selected position and the CPU 162 recognizes and accepts instructions given by the user through the selected and detected button in accordance with a program stored in the ROM unit 164.

A cash-card reader/writer 184 reads the contents of a cash card made in advance by a bank and writes information into it. A bill discriminating device 174 reads money, recognizes the value of the money and carries out some calculation. A bill inserted from the bill acceptance and dispense module 144 is supplied to the bill discriminating device 174 by a bill separating and stacking device 172 or a bill to be output from a bill-cash storage 173 is supplied to the bill discriminating device 174. The bill separating and stacking device 172 is also used for ejecting the bill to be output from the bill discriminating device 174 to a bill acceptance and dispense module 144. A coin discriminating device 178 and a coin handling unit module 176 operate on a coin inserted from or to be output to the coin acceptance and dispense module 145 in the same way as the bill discriminating device 174 and the bill separating and stacking device 172 operate on a bill inserted from or to be output to the bill acceptance and dispense module 144.

A passbook carrying and ejecting device 180 is used for conveying a saving passbook inserted to a passbook insert window 141 to a passbook discriminating device 181 and then setting the saving passbook so that information can be printed onto the saving passbook by a printer 188. A saving passbook on which information has been printed by the printer 188 is ejected from the passbook insert window 141. Information printed on a saving passbook by the printer 188 includes a balance, an amount of deposited money and an amount of drawn money. The passbook discriminating device 181 is used for reading a bank identification number and an account number which are recorded as magnetic stripes normally stuck on the back cover of the saving passbook. When the user does not insert a cash card, the CPU 162 utilizes these pieces of information read out from the saving passbook. A communication port 168 and a modem circuit 170 are used for exchanging information with other apparatuses by way the public telephone line 7.

(C) IC-Card Reader/Writer 182

Figure 4:
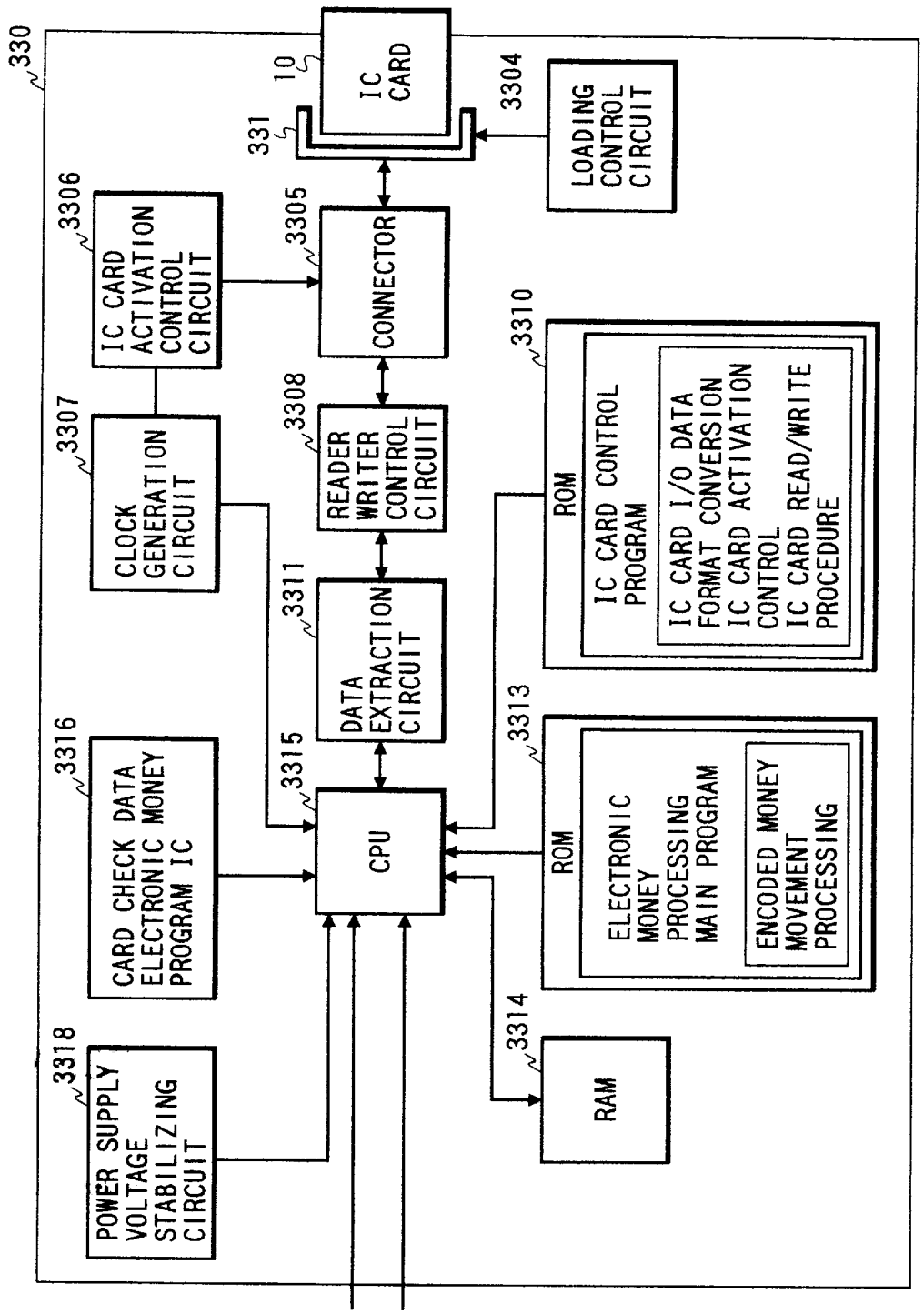
FIG. 4 is a schematic block diagram showing an IC-card reader/writer employed in the automatic teller machine shown in FIG. 2.

A detailed circuit of the IC-card reader/writer 182 is shown in FIG. 4. Components other than an IC-card loader 331, a connector 3305 and a power-supply-voltage stabilizing circuit 3318 are built into a single IC chip. Since a program having a function for controlling operations to deposit and draw money contained in an IC card 10 is embedded in the IC circuit, fraudulent operations such as manipulation of an IC card 10 or modification of a money balance held in the IC card 10 by using a fraudulent method can be prevented.

This is one of the improvements. That is, CPU 162 in FIG. 3 issues to CPU 3315, commands indicative of processing to be executed on electronic money, but it cannot move electronic money from or to IC card 10. The program required for movement of the electronic money from or to IC card 10 is stored in either ROM 3310 or 3313, and CPU 3315 executes the movement in accordance with the program. As ROM 3310 or 3313 and CPU 3315 are implemented in a single IC chip, it is substantially impossible to decode this program for fraudulent purposes.

Reference numeral 330 shown in the figure is a main body of the IC-card reader/writer 182. As shown in the figure, the main body 330 comprises a loading control circuit 3304, the connector 3305, an IC-card-activation control circuit 3306, a clock generating circuit 3307, a reader/writer control circuit 3311, a ROM unit 3310, a data extracting circuit 3307, a main program ROM unit 3313, a RAM unit 3314, a CPU 3315, an IC-card check data storage unit 3316 and the power-supply-voltage stabilizing circuit 3318. When a reset signal is further supplied, CPU 104 in IC card 10 (FIG. 5) starts its operation. That is, the IC card 10 is thereby activated.

The CPU 3315 reads out IC data showing an information type stored in the IC card 10 from the IC card 10 by way of the connector 3305, the reader/writer control circuit 3308 and the data extracting circuit 3311. These operations are carried out by executing a program stored in the ROM unit 3310 in conformity with ISO standards. The program stored in the ROM unit 3310 typically include format transformation for adjusting the format of an IC card and a data input format to the protocol of the IC card, a procedure for activating the IC card and a procedure for reading and writing information from and to the IC card.

The CPU 3315 compares ID data read out from the IC card 10 with data stored in the IC-card check data storage unit 3316 in order to find out whether or not electronic-money information is stored in the IC card 10. If the existence of the electronic-money information in the IC card 10 is verified, the IC-card reader/writer 182 is put in a state capable of carrying out operations by a program stored in the main program ROM unit 3313 and performs processing in accordance with the program. That is, storing of electronic money into IC card 10, withdrawal of electronic money therefrom and readout of transaction records therefrom are conducted under control of CPU 162 (FIG. 3).

(D) IC Card 10

Figure 5:
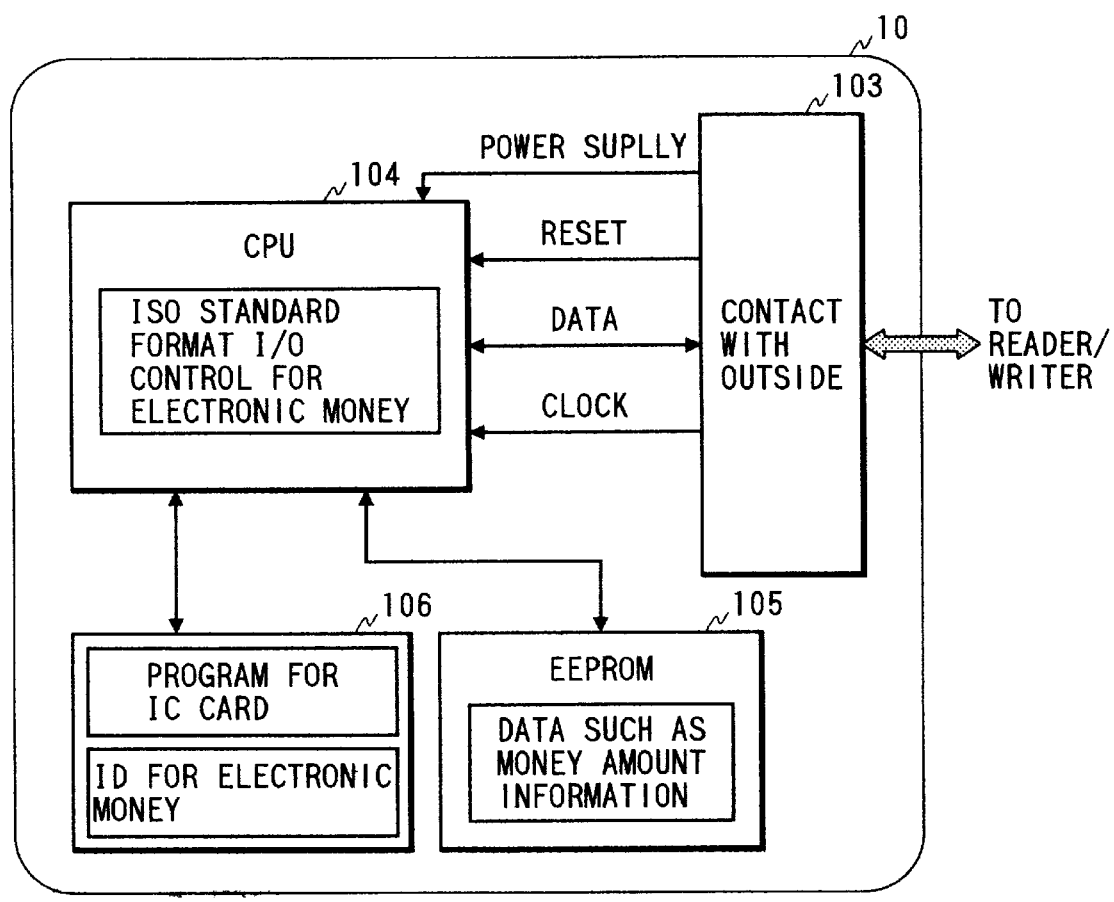
FIG. 5 is a schematic block diagram showing an IC card used in the automatic teller machine shown in FIG. 2.

FIG. 5 is a block diagram showing an IC card 10. Components shown in the block diagram are built into a single independent IC circuit in order to prevent the fraudulent use of the electronic money. A contact portion 103 is used for connecting the IC circuit to the external world. The contact portion 103 is to be connected to the connector 3305 of the IC-card reader/writer 182.

Reference numerals 104, 105 and 106 are a CPU, an EEPROM unit and a ROM unit respectively. The IC card 10 containing electronic money comprises, among other components, the contact portion 103 for exchanging signals with the outside world and receiving power, a clock signal and a reset signal from the outside world, the CPU 104 for controlling the operation of the IC card 10, the ROM unit 106 for storing a program to be executed by the CPU 104 and an EEPROM unit 105, a re-writable memory for storing data such as the electronic money.

The CPU 104 carries out protocol control for inputting and outputting data in conformity with ISO standards and encipherment processing by execution of the program stored in the ROM unit 106. As for functions required by an electronic wallet, the CPU 104 writes information on the remaining amount of electronic money and transaction information such as records of receipts and payments made so far into the EEPROM unit 105. The information on the remaining amount of electronic money is used to know a balance while the transaction information such as records of receipts and payments made so far can be read out and printed at the user's request. In this way, the user can verify transactions made so far. In case a bank identification number and a bank account number are to be stored in IC card 10, they are stored in EEPROM 105. A password for identifying authenticity of a user of the card is also stored therein, and can be modified if requested by the user. ROM 106 holds identification data indicative of a kind of information, and authenticity of the card is checked by comparing this identification data with identification data stored in card check data storage unit 3316.

As one of functions absolutely required for top-secret protection of the IC card 10, a lock/unlock facility is provided. The lock/unlock function is used for preventing users other than an authorized one from drawing electronic money contained in the IC card 10. With the IC card 10 inserted in a lock apparatus (not shown) installed in a bank branch or owned by the user, the user can lock purposes in order to lock the IC card 10. It should be noted that the lock apparatus itself is not shown in the figure. The unlock function is carried out by using a similar lock apparatus and the user's password number.

As will be described below, in the case of the present embodiment, the automatic teller machine 14 can also unlock a locked IC card. In a locked IC card, a flag indicating the locked state is stored in the EEPROM unit 105. Electronic money can not be drawn from a locked IC card. Nor transaction records can be read out therefrom. However, additional electronic money can be stored into the locked IC card and the balance of electronic money already stored therein can be verified. In order to implement these functions, when an attempt is made to access the IC card by the user or from external equipment, the CPU 104 in the IC card determines whether or not the IC card is locked, carrying out control as to whether the access should be executed or not.

(E) Machine Operations

Next, operations carried out by the automatic teller machine 14 in a variety of applications are explained. The operations carried out by the automatic teller machine 14 to be described below are implemented through control of various circuits and units executed by the CPU 162 shown in FIG. 3 in accordance with the program stored in the ROM unit 164. In addition, in order to request the user to carry out an operation to enter specific information, the automatic teller machine 14 displays guidance information, a plurality of menus to be selected or a plurality of buttons to be pressed on the touch panel 146. In the following description, however, if the guidance information or menus displayed by the automatic teller machine 14 for requesting the user to carry out a specific operation are obvious, the explanation of the guidance information or the menus is omitted. Instead, in some cases, the operation carried out by the user in response to the displayed guidance information or the displayed menus is explained.

(E1) Depositing Electronic Money

Figure 6:
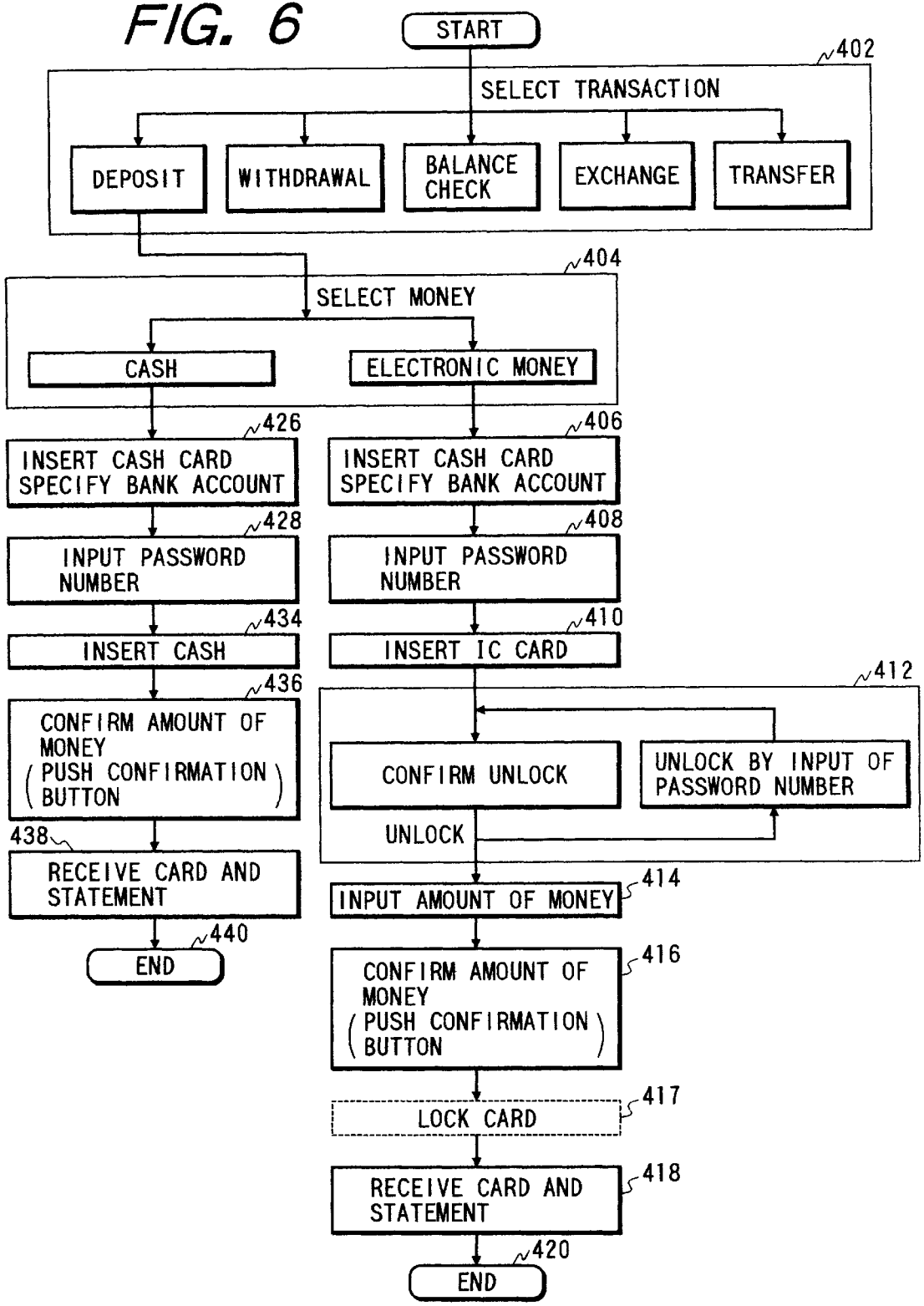
FIG. 6 is a flowchart of a process of depositing electronic money or cash to an account implemented in the automatic teller machine shown in FIG. 2.

Operations carried out by the automatic teller machine 14 and the user to deposit electronic money from an IC card to a bank account owned by the user are explained by referring to FIG. 6.

(1) First of all, in an initial state, a plurality of menus showing a variety of handling are displayed on the touch panel 146 to request the user to select one of the menus. These menus are items common to any transactions, be the transaction the one involving cash, a bank account or electronic money. Thus, in essence, the user can use different kinds of money such as cash and electronic money according to the same operational procedure as the conventional one. Let a deposit menu be selected at a step 402. The user can be requested to carry out an operation in one or a plurality of ways of the conventional guidance known so far. The user is notified of the instruction in one of several known ways. For example, instructions are displayed on the touch panel or some locations on relevant screens or the menus displayed on the touch panel are put in a blinking state. As an alternative, an audio warning is output. This method is also adopted to request the user to carry out other operations in a variety of procedures to be described later.

(2) When the deposit menu is selected, menus for cash and electronic money are displayed on the touch panel 146 at a step 404 to request the user to select the use of either cash or electronic money. Let us assume that the user selects the menu for depositing electronic money. When the user selects the electronic-money deposit menu, the processing flow goes on to a step 406. Before explaining the step 406, let us explain in brief a procedure comprising steps 426 to 440.

The procedure comprising the steps 426 to 440 is the same as the operation to deposit cash by using the conventional automatic teller machine. The user is requested to specify a bank account number. To put it concretely, the user is requested to insert a cash card made in advance by the bank to a card insert window 143 at the step 426. The inserted cash card is conveyed to the cash-card reader/writer 184 in which the identification number of the transaction bank and the bank account number of the user are read out from the cash card. It should be noted that, instead of a cash card, the bank identification number and the bank account number can also be entered by pressing ten keys of a keyboard not shown in the figure or ten keys shown in the touch panel 146 or by using other input means. As an alternative, the user can insert a saving passbook for the bank account to the passbook insert window 141. The insertion of a cash card can be made unnecessary when the user has inserted the saving passbook. The bank account number recorded as magnetic stripes on the saving passbook is read out by the passbook discriminating device 181 and made available as well.

Next, at the step 428, the user is requested to enter an individual password number as an individual identification number in order to verify the validity of the user. The validity of the user is verified from the bank account number and the password number. It should be noted, however, that when the user uses a saving passbook, the operation to enter a password number and the verification of the user's validity based on the entered password number can be omitted in the case of a transaction to deposit money. After the validity of the user has been verified or when the verification is omitted, the cash to be deposited is entered by way of the bill acceptance and dispense module 144 at the step 434.

The number of bills of the inserted cash is physically counted by the bill discriminating device 174 shown in FIG. 3, and the amount of money is computed and then displayed on the touch panel 142. The user verifies whether or not the displayed amount of money is correct and if the displayed amount of money is found correct, the user presses a confirmation button at the step 436. As the confirmation button is pressed, the procedure for depositing money is started. To put it concretely, the amount of money of the inserted bills as well as the bank identification number and the bank account number are communicated to a computer in the bank computing center 5 by way of a communication port 168, a modem port 170, the bank branch system 1 and a dedicated line 70. The computer records the amount of deposited money in the account specified by the bank account number and updates the balance. The cash deposited by the user is kept in the bill-cash storage 173. If a saving passbook has been inserted, the transaction is recorded on the saving passbook and the amount of deposited money as well as the final balance in the account of the user are printed on a detailed written statement. At the step 438, the inserted cash card and the detailed written statement are ejected. The processing flow then goes on to the step 440 to complete the transaction to deposit cash.

(3) When the user selects electronic money at the step 404, as described above, the processing flow proceeds to the step 406 at which the user is requested to specify the transfer bank identification number and the bank account number. The transfer bank identification number and the bank account number can be specified in exactly the same way as the step 426. Normally, a cash card is inserted. This is because an IC card may or may not have the transfer bank identification number and the bank account number.

It is also because deposit of electronic money held in the IC card into a bank account of an account number held in the cash card is required, in economic activity which uses cash and electronic money together.

The procedure for depositing electronic money held in the IC card into a bank account of a bank identification number and a bank account number both held therein will be explained later on as the second embodiment. Briefly speaking, in this procedure, IC card 10 is inserted before the step 406, a bank identification number and a bank account number are read out from this card and are used to designate the bank account necessary for the depositing. Therefore, the step 406 can be omitted.

The processing flow then goes on to the step 408 at which a password number is entered and the validity of the user is verified from the specified bank account number and the entered password number. Exceptional processing can also be carried out when the user enters a saving passbook as is the case with an operation to deposit cash carried out at the step 428 as described previously. After the validity of the user has been verified, the processing flow goes on to a step 410 at which the user is requested to enter an IC card 10 containing electronic money to a card insert window 143. The inserted IC card 10 is conveyed to the IC-card reader/writer 182 shown in FIG. 3.

(4) It is necessary to reset the lock state of the IC card owned by the user in advance by using an unlock apparatus installed in a bank branch or owned by the user so that electronic money can be drawn from the IC card. It should be noted that the unlock apparatus itself is not shown in the figure as described earlier. As the IC card is inserted to the automatic teller machine 14, the automatic teller machine 14 examines whether or not the IC card is locked. If the IC card is found locked, the lock state is displayed on the touch panel 146 in order to request the user to unlock the IC card. When the lock state of the IC card is not reset, the user enters a password number by pressing ten keys of a keyboard not shown in the figure or ten keys displayed on the touch panel 146 in order to reset the lock state of the IC card at a step 412.

(5) The processing flow then proceeds to a step 414 at which the user enters the amount of electronic money to be transferred to the bank account from the IC card 10. The processing flow then goes on to a step 416 at which the user checks whether or not the amount of deposited electronic money is correct and presses the confirmation button if found correct. If a confirmation message is displayed on the touch panel 146, the user specifies the display portion in order to express confirmation. If the amount of money specified at the step 414 exceeds the electronic money contained in the IC card 10, an input error message is displayed and the display of a request for correction follows. In this case, the user needs to reenter the amount of money to be deposited by entering a correction by way of the touch panel 146 or requesting correction by pressing a special correction button. At the end of the step 416, the operation to deposit electronic money is completed.

(6) Thereafter, in the automatic teller machine 14, the CPU 162 shown in FIG. 3 draws electronic money of the amount specified by the user from the electronic money contained in the IC card 10 through the IC-card reader/writer 182. The amount of drawn electronic money is communicated under the control carried out by the CPU 162 to the electronic-money transaction management terminal 16 by way of the communication port 168, the modem circuit 170 and the internal communication line 13 inside the bank branch system 1. The amount of drawn electronic money is further transferred to an electronic value box 15 in the bank branch system 1 under the control carried out by the electronic-money transaction management terminal 16. Then, the automatic teller machine 14 further performs the processing to deposit the electronic money into the bank account of the user. The operations carried out in this processing are the same as those explained for cash depositing.

(7) The processing flow then goes on to a step 417 at which a message is displayed on the touch panel 146 to remind the user of whether or not the IC card 10 is to be locked again. The user can select to lock the IC card again or leave the IC card unlocked as it is. It should be noted that there will be no problem in particular if this step is omitted. In order to preserve safety, however, the existence of this step is convenient for the user who desires to lock the IC card again.

(8) Thereafter, the automatic teller machine 14 records the transaction on a saving passbook if the saving passbook has been inserted, or creates a detailed written statement of the transaction if no saving passbook has been inserted in the same way as the cash transaction described previously. Finally, the automatic teller machine 14 ejects the IC card and the saving passbook or the cash card and the detailed written statement. The processing flow then goes on to a step 418 at which the user picks up the IC card and the saving passbook or the cash card and the detailed written statement. Then, at a step 420, the processing is completed.

(E2) Drawing Electronic Money

Figure 7:
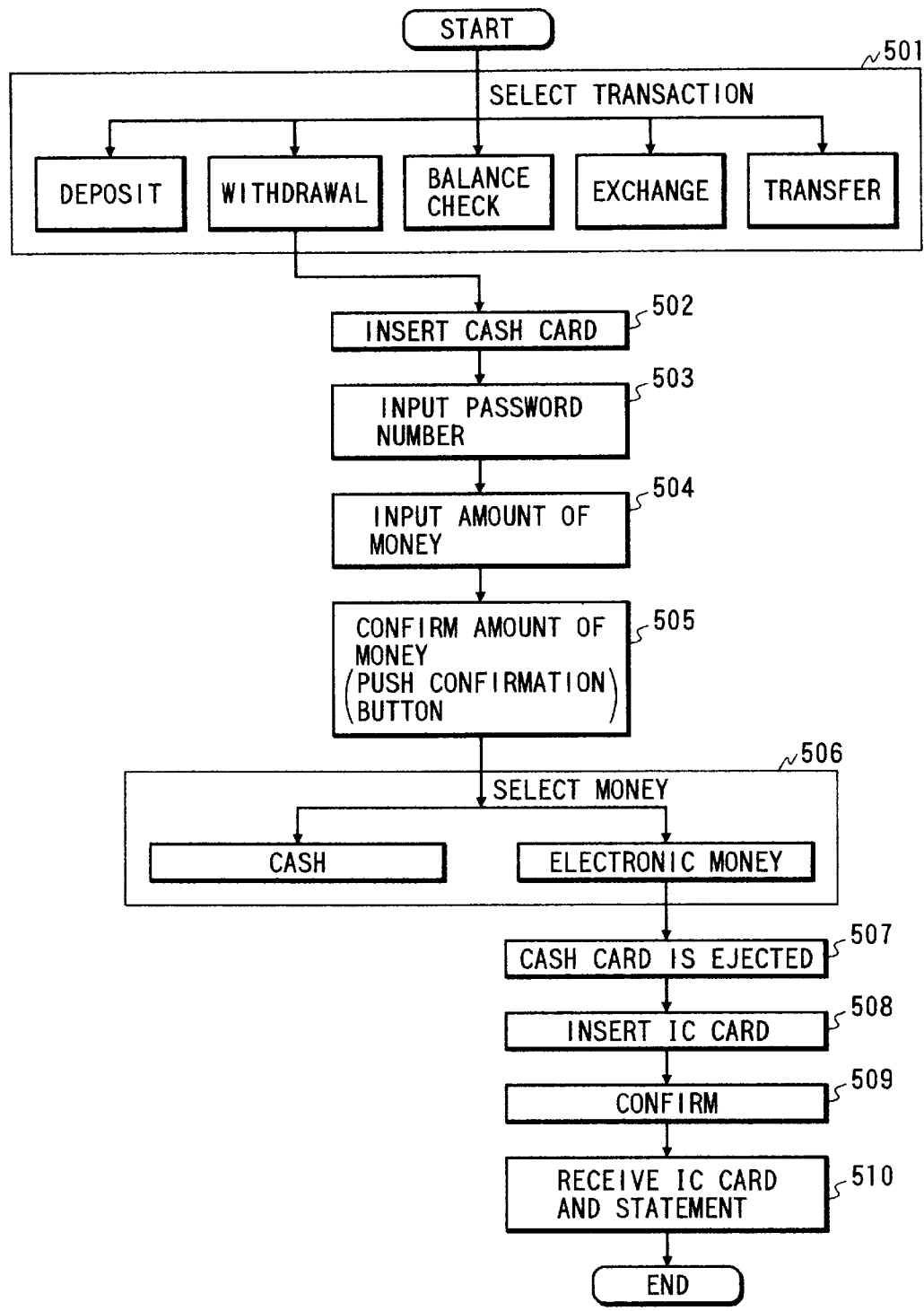
FIG. 7 is a flowchart of a process of drawing money implemented in the automatic teller machine shown in FIG. 2.

Processing to draw electronic money from a saving account to an IC card containing electronic money is explained by referring to FIG. 7.

(1) First of all, in an initial state, a plurality of menus showing a variety of transactions are displayed on the touch panel 146 to request the user to select one of the menus. Let a "Withdraw" menu be selected at a step 501.

(2) The processing flow goes on to a step 502 at which the user is requested to enter a cash card and a saving passbook if the draw transaction needs to be recorded in the saving passbook. In response to the request, the user inserts a cash card to a card insert window and the saving passbook to a passbook insert window. The processing flow then proceeds to a step 503 at which the user is requested to enter a password number. In response to this request, the user enters a password number. The operations are carried out at the steps 502 and 503 in the same way as the case of depositing cash or electronic money described earlier. However, the operation to enter a password number can not be omitted in the processing to draw electronic money even if the user inserts a saving passbook.

(3) If the validity of the user can be verified, the processing flow goes on to a step 504 at which the user is requested to enter the amount of electronic money to be drawn and kept into the IC card. In response to the request, the users specifies the amount of electronic money to be drawn. The processing flow then continues to a step 505 at which the user is requested to confirm a displayed amount of electronic money specified by the user. In response to the request, the user confirms the displayed amount of electronic money.

(4) After completing the step 505, the processing flow goes on to a step 506, at which a screen is displayed on the touch panel 146 to request the user to select whether cash should be drawn or electronic money should be transferred to an IC card. At this step, the user selects "Electronic money" because electronic money is to be transferred to an IC card. If "Cash" were selected, operations of the automatic teller machine and operations of the user would be carried out in the same way as the conventional automatic teller machine. Therefore, these operations are not shown in the figure. To put it concretely, after the step 436 shown in FIG. 6 has been executed, cash is ejected and then the step 438 is further carried out.

(5) As "Electronic money" is selected at the step 506, the processing flow proceeds to a step 507 at which the cash card is ejected. The processing flow then goes on to a step 508 at which the user is requested to insert an IC card to the card insert window 143. In response to the request, the user inserts the IC card.

(6) The automatic teller machine 14 carries out processing to draw electronic money from the saving account and transfer the money to the IC card. The processing to draw electronic money from a saving account is the same as the processing to deposit electronic money to a saving account. The electronic money to be put into the IC card is transferred in a direction opposite to the operation to deposit money from the IC card explained previously from the electronic value box 15 in the bank branch system 1 to the automatic teller machine 14 under the control carried out by the electronic-money transaction management terminal 16 and then put into the IC card 10 by the IC-card reader/writer 184 under the control carried out by the CPU 162. The processing flow then goes on to a step 509 at which the completion of the operation to put the drawn money into the IC card is displayed on the touch panel 146. After the user verifies the transaction, the IC card is ejected and, if a saving passbook has been inserted, the transaction is recorded on the saving passbook. If only a cash card has been inserted, a detailed written statement of the transaction is created and the IC card as well as the saving passbook or the detailed written statement are ejected. The processing flow finally goes on to a step 510 at which the user pick ups the IC card as well as the saving passbook or the detailed written statement, completing the transaction.

In the processing flow shown in FIG. 7, the operation to reset the lock state of the IC card carried out at the step 412 of the processing flow shown in FIG. 6 is not required. This is because, in the case of transferring electronic money to an IC card, the transfer processing can be carried out even if the IC card is in a lock state. This holds true of other cases to be described later in which unlock processing is not explained.

The procedure shown in FIG. 7 is used when the IC card does not hold a bank identification number and a bank account number or when it is necessary to withdraw electronic money from a bank account different from a bank account designated by a bank identification number and a bank account number held in the IC card. The procedure for withdrawing electronic money from a bank account designated by a bank identification number and a account number held in IC card 10 will be explained later on as the second embodiment. Briefly speaking, in this procedure, IC card 10 is inserted before the step 502, a bank account number are read out from this card and are used to designate the bank account necessary for the withdrawal. Therefore, the step 502 is skipped. Steps 503 to 506 and 509 to 510 are executed as shown in FIG. 7, but steps 507 and 508 are further skipped.

(E3) Balance Check

Figure 8:
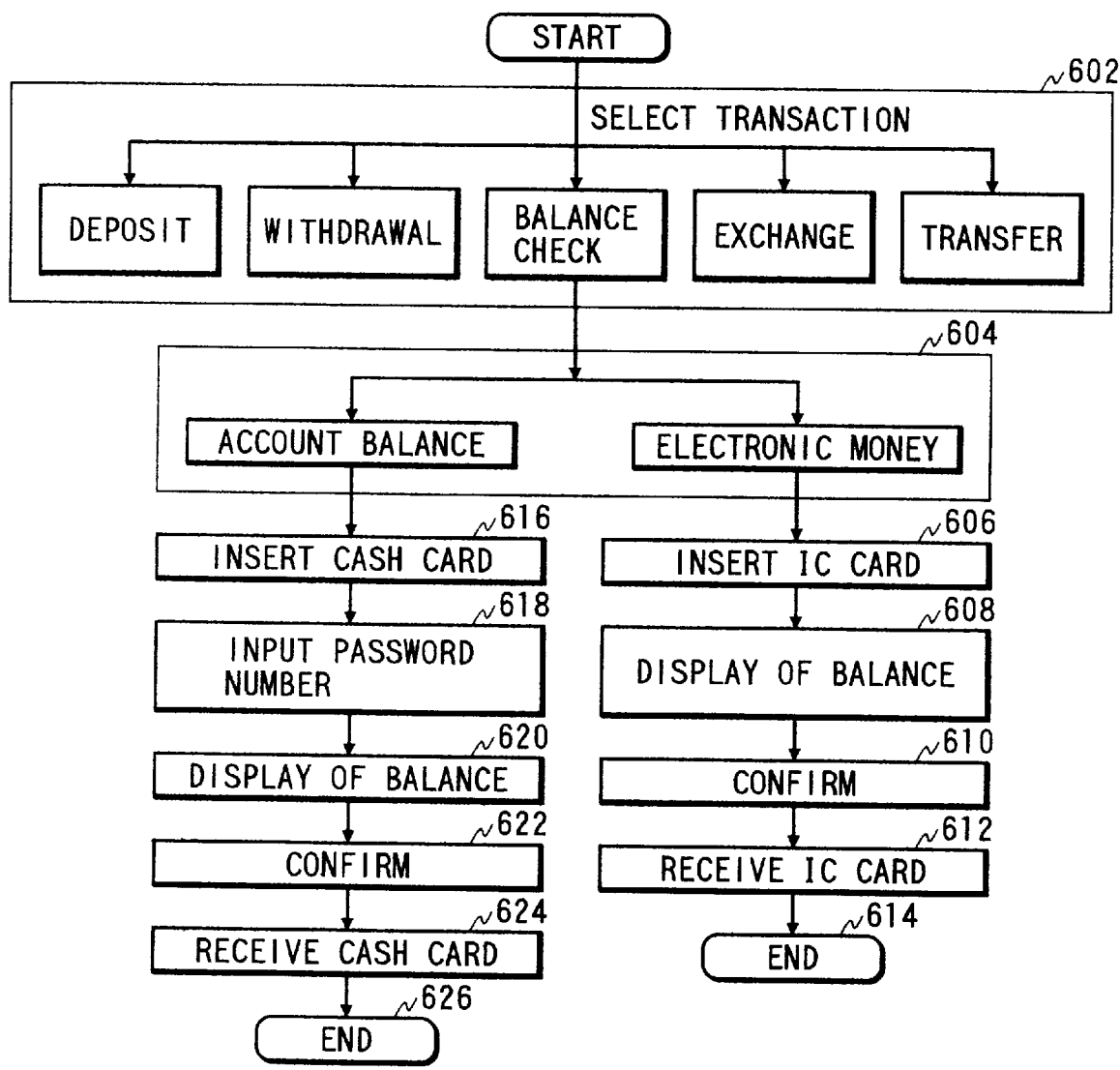
FIG. 8 is a flowchart of a process of verifying a balance implemented in the automatic teller machine shown in FIG. 2.

Processing to verify a balance of electronic money contained in an IC card used for holding electronic money is explained by referring to FIG. 8.

(1) First of all, in an initial state, a plurality of menus showing a variety of transactions are displayed on the touch panel 146 to request the user to select one of the menus. Let a "Balance Check" menu be selected at a step 602.

(2) As the "Balance Check" function is selected, the processing flow goes on to a step 604 at which a menu is displayed on the touch panel 146, allowing the user to select either a balance inquiry for cash in a bank account or a balance inquiry for electronic money contained in an IC card 10. If "Account Balance" is selected, the user is requested to specify a bank account like the conventional procedure. In this case, the processing flow goes to a step 616 at which the user is requested to insert a cash card. The processing flow then proceeds to a step 618 at which the user is requested to enter a password number. After the user inserts a cash card end enters a password number, the processing flow goes on to a step 620 at which the balance is displayed. The processing flow then goes on to a step 622 at which the user is requested to verify the displayed balance. After the user verifies the displayed balance, the processing flow proceeds to a step 626 at which the inserted cash card is ejected. The user finally pick ups the cash card, completing a sequence of operations carried out in the processing to inquire the balance in the bank account.

When a user wants to know a balance of a bank account of an account number held in IC card, the IC card is inserted in stead of the cash card at step 616. Steps 618, 620 and 622 are executed in the similar way. As a result, it is possible for the user to know a balance of the bank account. The IC card is removed from the teller machine at step 624.

If a balance inquiry of electronic money contained in an IC card 10 is selected at the step 604, on the other hand, the processing flow continues from the step 604 to a step 606.

(3) At the step 606, the user is requested to insert an IC card to the card insert window.

(4) The processing flow then goes on to a step 608 at which the automatic teller machine 14 reads out a balance of electronic money from the IC card and displays the balance.

(5) The processing flow then continues to a step 610 at which the user is requested to verify the displayed balance. The processing flow then goes on to a step 612 at which the user pick ups the IC card, completing the processing.

(E4) Exchanging Money (Part 1)

Figure 9:
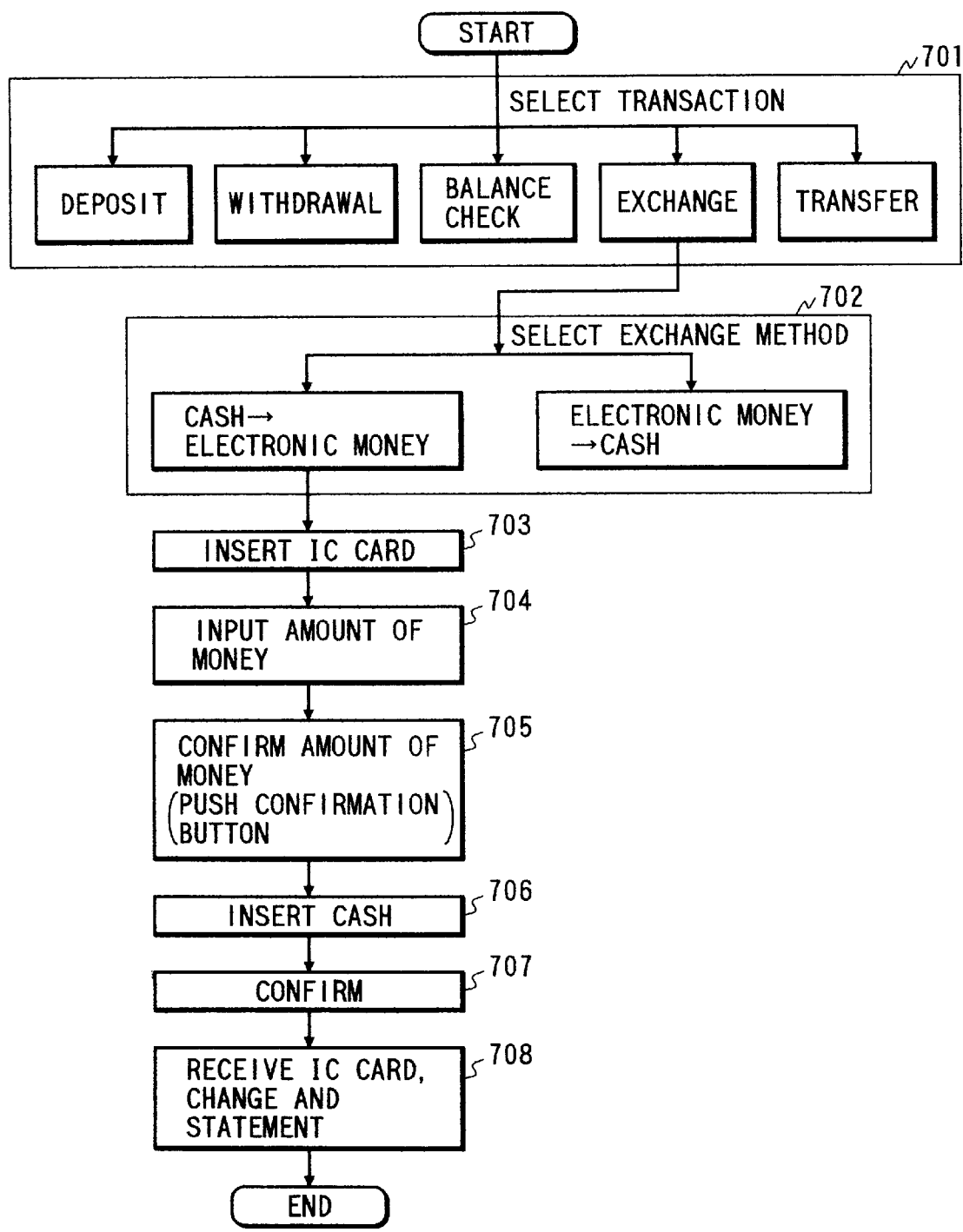
FIG. 9 is a flowchart of a process of exchanging cash into electronic money implemented in the automatic teller machine shown in FIG. 2.

Processing to exchange an amount of inserted cash with electronic money and put the electronic money in an IC card containing electronic money is explained by referring to FIG. 9.

(1) First of all, in an initial state, a plurality of menus showing a variety of transactions are displayed on the touch panel 146 to request the user to select one of the menus. Let an "Exchange" menu be selected at a step 701.

(2) As the "Exchange" transaction is selected, the processing flow then goes on to a step 702 at which a menu is displayed on the touch panel 146, allowing the user to select an exchange from cash to electronic money or from electronic money contained in an IC card to cash. Let "Cash to electronic money" be selected to convert cash into electronic money to be put in an IC card.

(3) The processing flow then goes on to a step 703 at which the user is requested to insert an IC card. After the user inserts an IC card, the processing flow proceeds to a step 704 at which the user is requested to enter the amount of money to be exchanged.

(4) After the user specifies the amount of money to be exchanged, the processing flow continues to a step 705 at which the amount of money specified by the user is displayed and the user is requested to confirm the displayed amount of money. The user confirms the displayed amount of money by pressing a confirmation button. Then, the processing flow goes on to a step 706 at which cash is entered to the bill acceptance and dispense module 144 and the coin acceptance and dispense module 145.

(5) The processing flow then proceeds to a step 707 at which the automatic teller machine 14 computes the value of the entered bills and coins and displays the value. If the user confirms the displayed value, the IC-card reader/writer 184 carries out processing to transfer the amount of money to be exchanged to the IC card as electronic money under the control executed by the CPU 162. The processing flow then goes on to a step 708 at which a difference between the value of the entered bills and coins and the amount of the converted money (that is, a change) is calculated, a detailed written statement is created and the IC card, a change and the detailed written statement are ejected. The user then picks up the IC card, the change and the detailed written statement, finishing the transaction.

(E5) Exchanging Money (Part 2)

Figure 10:
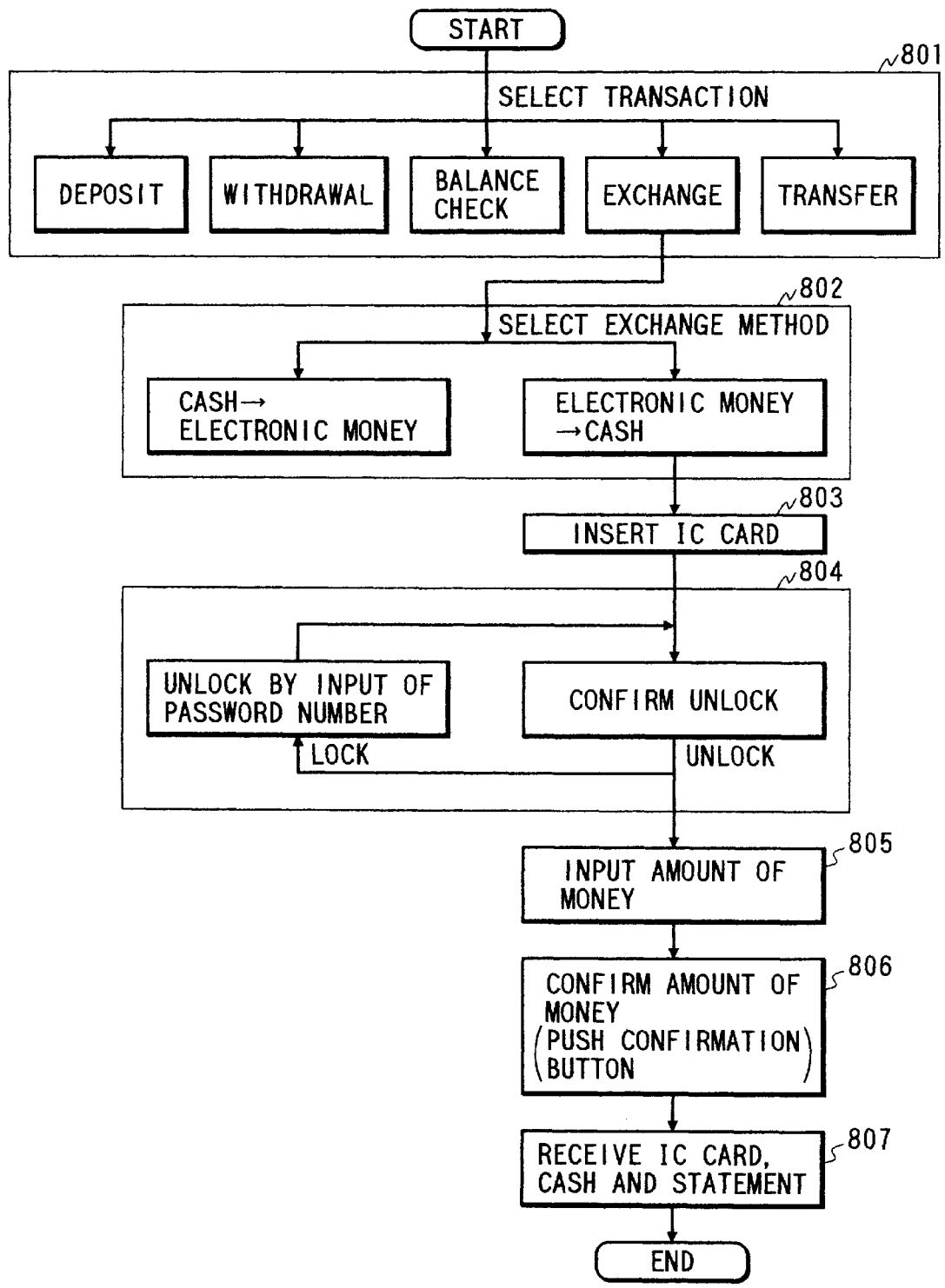
FIG. 10 is a flowchart of a process of exchanging electronic money into cash implemented in the automatic teller machine shown in FIG. 2.

Processing to exchange electronic money contained in an IC card with cash and deliver the cash to the user is explained by referring to FIG. 10.

(1) First of all, in an initial state, a plurality of menus showing a variety of transactions are displayed on the touch panel 146 to request the user to select one of the menus. Let an "Exchange" menu be selected at a step 801.

(2) As the "Exchange" transaction is selected, the processing flow then goes on to a step 802 at which a menu is displayed on the touch panel 146, allowing the user to select an exchange from cash to electronic money or from electronic money contained in an IC card to cash. Let "Electronic money to cash" be selected by the user to convert cash into electronic money to be put in an IC card.

(3) The processing flow then goes on to a step 703 at which the user is requested to insert an IC card.

(4) After the user inserts an IC card, the processing flow proceeds to a step 804 at which, in case the IC card is in a lock state, the user is notified of the fact that the IC card is locked and requested to unlock the IC card. At that time, the operations carried out by the automatic teller machine and the user are the same as those performed at the step 412 in the transaction to draw electronic money from an IC card shown in FIG. 6.

(5) The processing flow goes on to a step 805 at which the user is requested to enter the amount of money to be converted. After the user enters the amount of money to be converted, the processing flow proceeds to a step 806 at which the amount of money is displayed and user is requested to confirm the displayed amount of money. In response to the request, typically, the user presses the confirmation button.

After the amount of money to be converted is confirmed, the automatic teller machine 14 carries out the exchange processing. Electronic money of the amount specified by the user is drawn from the IC card and the drawn amount is communicated to the electronic value box 15 in the bank branch system 1 in the same way as the one described previously. Cash of the specified amount is further ejected from the bill-cash storage 173.

(6) The processing flow then goes on to a step 807 at which a detailed written statement is created and the IC card, the cash and the detailed written statement are ejected. The user picks up the IC card, the cash and the detailed written statement, completing the transaction.

(E6) Transferring Money

Figure 11:
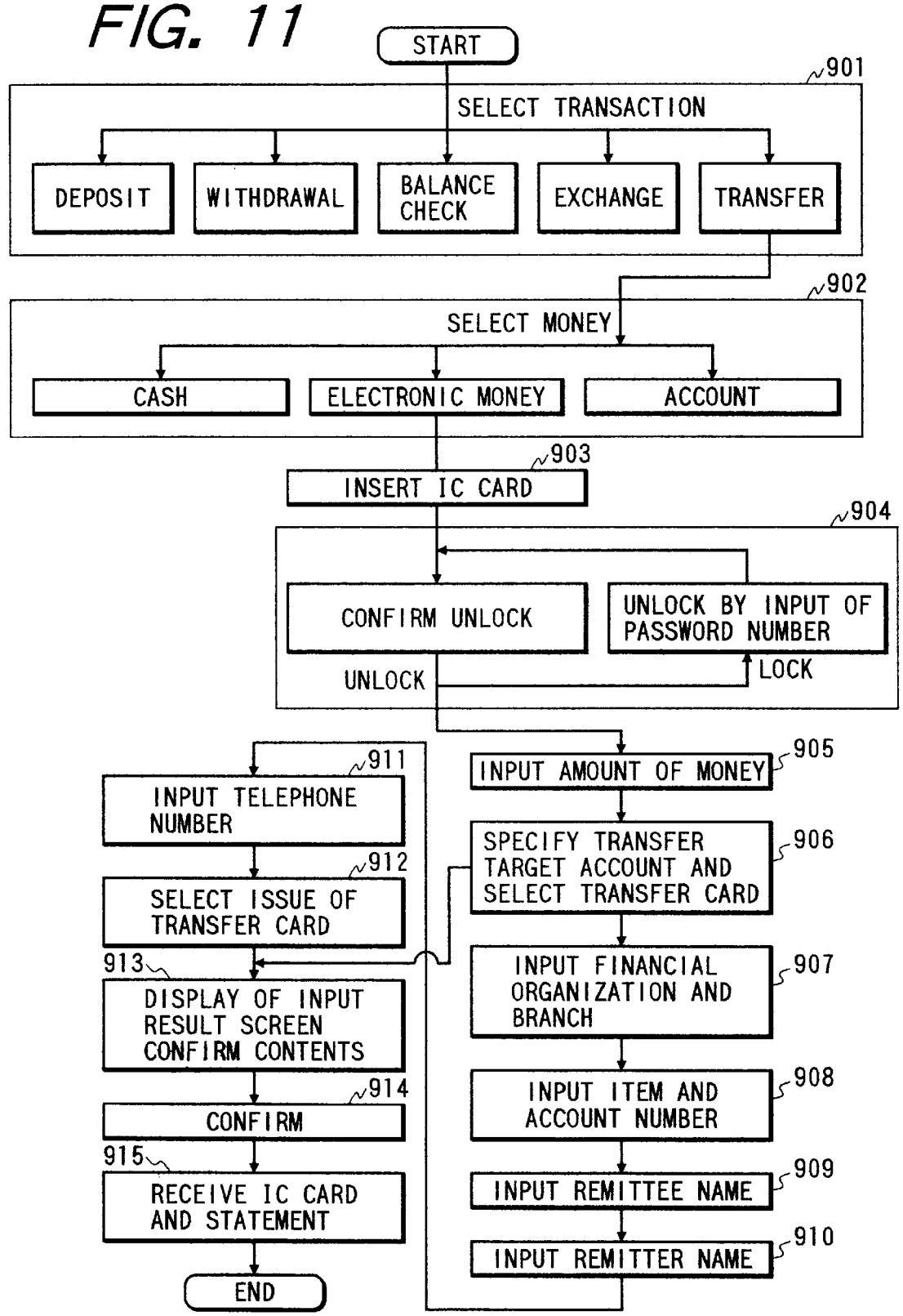
FIG. 11 is a flowchart of a process transferring money implemented in the automatic teller machine shown in FIG. 2.

Processing to transfer electronic money of a certain amount from an IC card to a bank account of another user is explained by referring to FIG. 11.

(1) First of all, in an initial state, a plurality of menus showing a variety of transactions are displayed on the touch panel 146 to request the user to select one of the menus. Let a "Transfer" menu be selected at a step 901.

(2) As the "Transfer" transaction is selected, the processing flow then goes on to a step 902 at which a menu is displayed on the touch panel 146, allowing the user to select cash, electronic money or the saving account of the user as a source of the money transfer. Let "Electronic money" be selected by the user as a source of the money transfer.

(3) The processing flow then goes on to a step 903 at which the user is requested to insert an IC card.

(4) After the user inserts an IC card, the processing flow proceeds to a step 904 at which, in case the IC card is in a lock state, the user is notified of the fact that the IC card is locked and requested to unlock the IC card. At that time, the operations carried out by the automatic teller machine and the user are the same as those performed at the step 412 in the transaction to draw electronic money from an IC card shown in FIG. 6.

(5) The processing flow then goes on to a step 905 at which a menu is displayed on the touch panel 146 to request the user to enter an amount of electronic money to be transferred and to confirm whether or not a transfer card issued by the bank to be used as a method for specifying a transfer target. It should be noted that information on the transfer target is recorded on the transfer card as magnetic stripes. Let us assume that the user selects a transfer of electronic money by not using a transfer card at the following step 906.

(6) The processing flow then goes on to a step 907 at which the user is requested to enter the names of the branch office and the financial organization of the transfer target. After the user enters the names of the branch office and the financial organization of the transfer target, the processing flow proceeds to a step 908 at which the user is requested to enter an item of the transfer account and a transfer number. After the user enters the item of the transfer account and the transfer number, the processing flow continues to a step 909 at which the user is requested to enter the name of the remittee of the electronic-money transfer. After the user enters the name of the remittee of the electronic-money transfer, the processing flow goes on to a step 910 at which the user is requested to enter the name of the electronic-money remitter, the user in this case. After the user enters the name of the electronic-money remitter, the processing flow proceeds to a step 911 at which the user is requested to enter the telephone number of the electronic-money remittter.

(7) The processing flow then continues to a step 912 at which an inquiry as to whether or not it is necessary to issue a transfer card for the user for use in transfers in the future is displayed. At this step, the user may request that a transfer card be issued. The processing flow then goes on to a step 913 at which the request and the pieces of information entered by the user at the steps 906 to 911 are displayed and the user is requested to confirm them.

(8) After the user confirms them, the processing flow goes on to a step 914 at which the automatic teller machine 14 draws electronic money of the amount specified by the user to be transferred from the IC card. The drawn electronic money is then moved to the electronic value box 15 of the bank branch system 1. Then, the transfer of the electronic money to the bank account specified by the user is communicated to the bank computing center 5.

(9) The processing flow then continues to a step 915 at which a detailed written statement of the transaction is created and the IC card and the detailed written statement are ejected. If the user has requested that a transfer card be issued at the step 912, such a transfer card is also issued as well. The user than picks up the detailed written statement, the IC card and the transfer card, if issued, completing the transaction.

It should be noted that, if a transfer by using a transfer card is selected at the step 906, on the other hand, the user enters the transfer card. After the user enters the transfer card, the processing flow jumps to the step 913 at which the contents of the transfer card are displayed. The processing flow then goes on to the step 914 to carry out the processing at this step and the subsequent steps.

If a transfer from a bank account is selected at the step 902, on the other hand, the processing flow goes on to the steps 502 and then 503 shown in FIG. 7 at which processing to draw money from a bank account is carried out instead of the processing performed at the steps 903 and 904. If a transfer from a cash source is selected at the step 902, the processing flow goes on to the steps 426, 428 and then 434 shown in FIG. 6 at which processing to deposit money is carried out instead of the processing performed at the steps 903 and 904.

With the embodiment of the present invention described above, it is possible to execute transactions to deposit money, to draw money, to convert money into cash as well as to transfer money and others by using an IC card containing electronic money. In addition, the procedures to carry out the transactions are very close to the transactions using cash. When it is necessary to enter the name of a bank and an account number as is the case with the transactions to deposit and draw money, by also using a conventional cash card, the transactions can be each carried out in accordance with entirely the same procedure, be the card used in conjunction with the conventional cash card an IC card having the pieces of information, that is, the name of a bank and an account number or another card. A plurality of cards including a conventional cash card, a transfer card and an IC card can be handled efficiently depending upon the type of the transaction.

<Modifications of the First Embodiment>

In the case of the first embodiment, in a transaction to deposit money shown in FIG. 6, after the user is requested to specify whether the money to be deposited is cash or electronic money at the step 404, the user is requested to enter a cash card and a password number, be the money to be deposited cash or electronic money. Thereafter, the user is requested to enter cash if the money to be deposited is cash or the user is requested to enter insert an IC card if the money to be deposited is electronic money. In the case of a transaction to draw money shown in FIG. 7, on the other hand, even though there is no inquiry issued to the user as to whether the money to be deposited is cash or electronic money, the user is requested to enter a cash card and a password number. The user is further requested to enter the amount of money to be drawn. Thereafter, the user is requested to specify whether the money to be drawn is cash or electronic money and to carry out operations in accordance with the type of money desired by the user.

The procedures described above can be modified as follows:

(1) The portions of the operational procedure for drawing money common to or similar to the operational procedure for depositing money is made the same as the operational procedure for depositing money shown in FIG. 6.

(2) The portions of the operational procedure for depositing money common to or similar to the operational procedure for drawing money is made the same as the operational procedure for drawing money shown in FIG. 7.

<Second Embodiment>

The first embodiment showed how an IC card without a bank identification number and a bank account number recorded therein or an IC card with a bank identification number and a bank account number recorded therein is handled together with a cash card to execute transaction to an account designated by the cash card. The present embodiment shows how an IC card with a bank identification number and a bank account number recorded therein is handled to execute transaction to an account designated by the bank identification number and the bank account number held by the IC card.

To be more specific, in the case of a transaction to deposit money, if electronic money is selected at the step 404 shown in FIG. 6, the user is requested to enter an IC card before a cash card is entered at the step 406. In the automatic teller machine 14, the CPU 162 examines whether or not a bank identification number and an account number are recorded in the IC card. If a bank identification number and an account number are recorded in the IC card, they are read out. Thereafter, the processing flow goes on to the step 408 at which the user is requested to enter a password number, skipping the step 406. The step 410 at which the user is requested to enter the IC card is therefore omitted.

If a bank identification number and an account number are not recorded in the IC card, on the other hand, the processing flow proceeds to the step 406 at which the user is requested to enter a cash card. The processing flow then goes on to the step 408. Also in this case, the step 410 at which the user is requested to enter the IC card is omitted as well.

The above processing can also be applied to a transaction to draw money shown in FIG. 7 as well. To be more specific, the steps 502, 503 and 508 are modified in the same way as the one described above. By modifying the procedure as described above, in the case of a transaction using an IC card with a bank identification number and an account number recorded therein, the step 507 at which a cash card is ejected is therefore not executed.

It should be noted that in the cases of an inquiry about a balance, a money conversion and a money transfer, the same processing as that for the first embodiment is carried out.

<Modification of the Second Embodiment>

In the case of the first embodiment, electronic-money cards in use can be limited to those each with a bank identification number and an account number recorded therein. In this case, in the processing procedure described above, when an IC card with a bank identification number and an account number not recorded therein is inserted, a message can be output to inform the user that such an IC card can not be used and then the processing is halted.

<Third Embodiment>

In the case of the first embodiment, at the money selecting step 404 of a transaction to deposit money shown in FIG. 6, a menu is displayed to request the user to select either "Cash" or "Electronic money". In the case of the third embodiment, this step is eliminated.

After the step 402 is executed, the screen to request the user to select money is not displayed. Instead, a guidance message such as "Enter a cash card to deposit cash or an IC card to deposit electronic money from the IC card" is displayed in order to request the user to enter a cash card or an IC card. If the user inserts a cash card, the step 428 and the subsequent steps are executed as the processing to deposit cash. In this case, since a cash card has already been inserted, the step 426 for inserting a cash card is omitted. If the user inserts an IC card, on the other hand, the step 406 and the subsequent steps are executed as the processing to deposit electronic money from the IC card. In this case, since an IC card has already been inserted, the step 410 for inserting an IC card is omitted.

It should be noted that the execution of the step 406 can be skipped as is the case with the second embodiment. The inserted IC card is checked to examine whether or not a bank identification number and an account number are recorded therein. If a bank identification number and an account number are found recorded in the inserted IC card, the step 406 is skipped.

By modifying the processing to draw money shown in FIG. 7 as follows, the step 506 for selecting the type of money can also be omitted as well. To be more specific, after the step 501 is executed, the user is requested to enter either a cash card or an IC card as described earlier. If a cash card is entered, the steps 503 and 505 are executed and then cash is ejected, skipping the step 506. If an IC card is entered, on the other hand, the method described in the second embodiment is adopted. The inserted IC card is checked to examine whether or not a bank identification number and an account number are recorded therein. If a bank identification number and an account number are found recorded in the inserted IC card, the steps 503 to 505 are carried out, skipping the steps 506 to 508 prior to the execution of the steps 509 and 510. If a bank identification number and an account number are found not recorded in the inserted IC card, on the other hand, the steps 502 to 505 are carried out, skipping the step 506 prior to the execution of the step 507. Thereafter, the steps 509 and 510 are executed, skipping the step 508.

In the case of an inquiry about a balance shown in FIG. 8, "Balance check" is selected at the step 602 as described previously. In this case, a message saying: "Enter a cash card to inquire a balance in a bank account or an IC card to inquiry an electronic-money balance in the IC card" is displayed in order to request the user to enter a cash card or an IC card. If the user enters a cash card, the processing flow jumps to the step 618, skipping the steps 604 and 616. If the user enters an IC card, on the other hand, the processing flow jumps to the step 608, skipping the steps 604 and 606.

In the case of processing to transfer money shown in FIG. 11, after the step 901 is executed, in place of the step 902, a guidance message saying: "Enter a cash card to transfer money from a bank account, an IC 52 card to transfer electronic money from the IC card, or cash for a cash transfer" is displayed in order to request the user to enter a cash card, an IC card or cash. If the user enters an IC card, the step 904 and the subsequent steps are carried out, skipping the step 903. If the user enters a cash card, the step 905 and the subsequent steps are carried out. If the user enters cash, the same processing as that for a cash card is carried out.

It should be noted that, in the case of a balance inquiry shown in FIG. 8 and money conversion processing shown in FIGS. 9 and 10, processing is carried out in accordance with the procedures shown in the respective figures.

<Fourth Embodiment>

Figure 12:
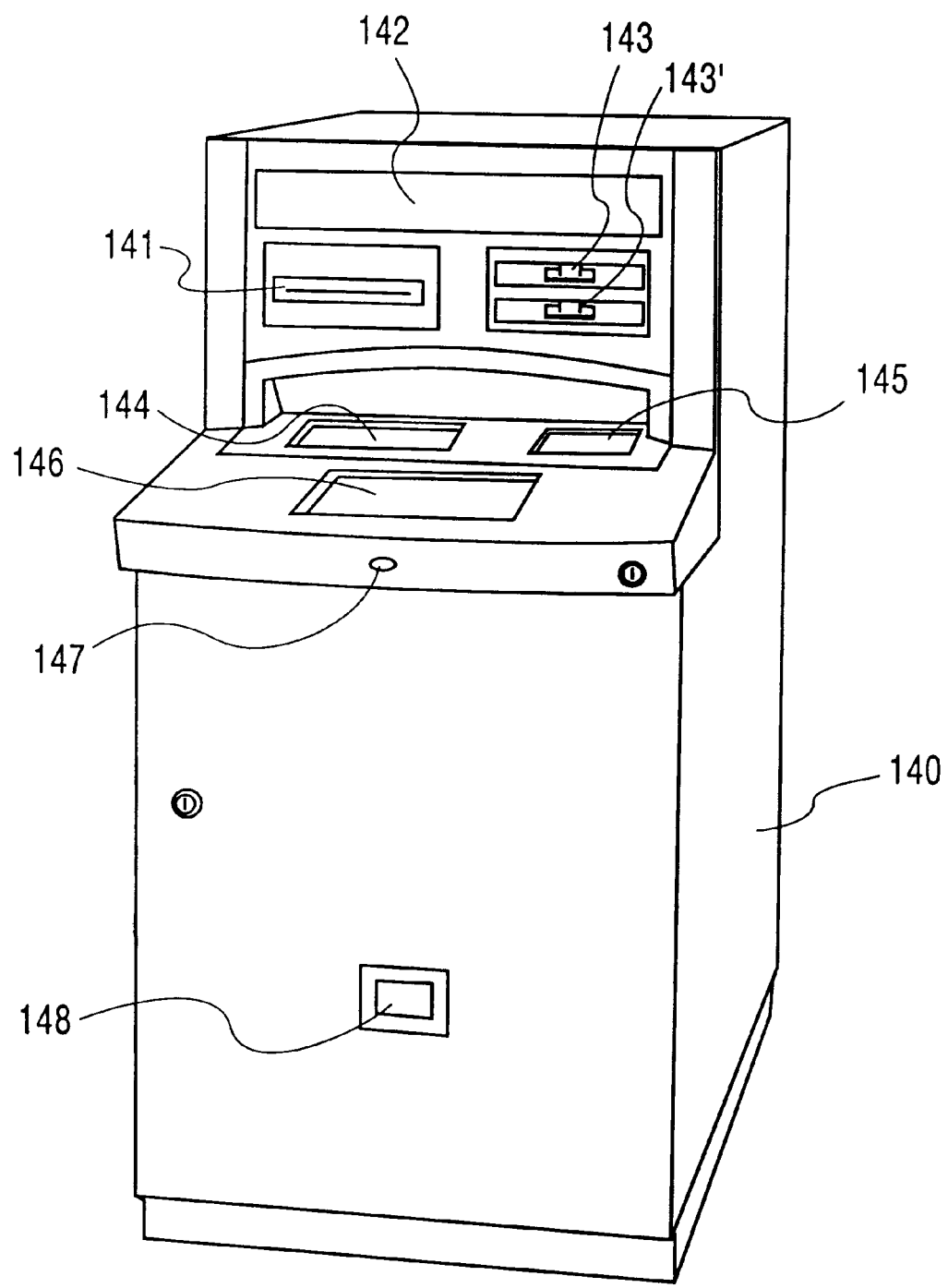
FIG. 12 is a perspective view showing a second embodiment of the present invention implementing the automatic teller machine employed in the electronic-cash system shown in FIG. 1.

FIG. 12 is a perspective view showing the external appearance of an automatic teller machine 14 according to a fourth embodiment of the present invention.

The automatic teller machine 14 shown in FIG. 12 is different from the one shown in FIG. 2 in that, in the case of the former, another card insert window 143' is provided in addition to the card insert window 143. The other card insert window 143' is used by the user specially for entering an IC card. On the other hand, the card insert window 143 is used by the user for entering a cash card or a transfer card as is the case with the embodiments described earlier. In general, the operation is easier to carry out if the user can enter a specific card to a card insert window provided specially for the specific card.

It should be noted, however, that the automatic teller machine can be designed so that both the card insert windows 143 and 143' can be used by the user for entering either a cash card, a transfer card or an IC card. For some users, such a configuration is desirable as far as the freedom to use the card insert windows is concerned. In the case of such a configuration, card conveying paths are designed so that an IC card or a cash card entered to either of the card insert windows 143 and 143' is conveyed to the IC-card reader/writer 182 or the cash-card reader/writer 184.

<Detailed Description of Electronic-Money System>

An electronic-money system, to which the present invention is applied, is described in detail as follows. In the retail-store system shown in FIG. 1, normally, a POS terminal 22 is connected to a center device 24 by an internal communication line 13 and a store controller 23. For electronic-money settlement purposes, an external IC-card reader/writer 11 is provided for the ordinary POS terminal 22. As an alternative, electronic-money POS terminals 21 are installed. The center device 24 comprises a value control and management system 25, a work station 26 and an electronic value box 15.

A public-user system 3 is mainly an individual-user system which comprises simply only an electronic wallet 31 capable of displaying the balance of electronic money contained in an IC card. It is possible to add functions of a calculator or the like to the electronic wallet 31. The personal computer 32 has a PC-type card reader/writer 33 for electronic-money settlement. The personal computer 32 can be connected to the public telephone line 7. It is also possible to use an IC-card telephone 34, an ordinary telephone which has processing functions of an IC card 10 for storing electronic money.

The personal computer 32 and the IC-card telephone 34 in the public-user system 3 can be each provided with two card reader/writers for handling two IC cards. In this way, a transaction involving electronic money between the two IC cards can be carried out. For example, electronic money of an IC card owned by a husband can be transferred to an IC card owned by the wife as is the case with a transaction involving cash.

An automatic vending machine system 4 is an automatic vending machine 42 with an IC-card reader/writer 41 embedded therein.

In a transaction to draw electronic money described earlier, an IC card owned by an individual can be connected to an IC card 10 in an electronic value box 15 in the bank branch system 1 by a communication function embedded in the IC card 10 owned by the individual by way of a banking teller terminal 12, the IC-card reader/writer 182 of the automatic teller machine 14 shown in FIG. 3 and the IC-card reader/writer 11 or 33 embedded in the personal computer 32 or the IC-card telephone 34 shown in FIG. 1. Then, under the control carried out by the electronic-money transaction management terminal 16, electronic money contained in the IC card 10 in an electronic value box 15 in the bank branch system 1 is transferred to the IC card 10 owned by the individual. In this transaction, the balance of the electronic money contained in the IC card 10 in an electronic value box 15 in the bank branch system 1 is reduced by the amount of the electronic money transferred to the IC card 10 owned by the individual. Money can be drawn from a saving account in the same way as the conventional transaction.

It is possible to draw money from a bank saving account owned by an individual to an IC card of the individual as electronic money to be stored in the IC card by using the automatic teller machine 14. It is also possible to put cash in an IC card as electronic money having an amount equivalent to the cash by taking the cash to a window of a bank or a window of an originator.

It also possible to return electronic money from an IC card owned by the user to an IC card in the electronic value box 15 in the bank branch system 1 by way of the banking teller terminal 12, the automatic teller machine 14 and the personal computer 32 and, at the same time, save the returned electronic money in the account of the user.

As described above, the user who has electronic money in an IC card 10 given to the user can purchase commodities by using the IC card in the same way as cash at a variety of stores and can receive a variety of services relating to electronic money.

Now, let the user who has electronic money in an IC card 10 given to the user purchase a commodity by using the IC card at a store and take the commodity to a counter of a POS terminal for payment of the commodity. Much like an ordinary transaction, the handler uses the POS terminal 21 or 22 for reading the price of the commodity from the bar code stuck to the commodity or the like and computing a total to be billed to the customer, the user in this case.

Let the customer pay the price by electronic money contained in the customer's IC card in place of cash. In this case, the IC card is inserted to a card insert window of an electronic-money POS terminal 12 or the IC-card reader/writer 11 connected to the ordinary POS terminal 22. The inserted IC card is connected to an IC card in an electronic value box 15 installed in the center device 24 of the store through the internal communication line 13 and the work station 26 to transfer electronic money from the inserted IC card to an IC card in an electronic value box 15 installed in the center device 24. A receipt is then issued by the POS terminal, ending the payment processing for the shopping. In this transaction, the electronic money stored in the IC card of the customer is reduced by the amount spent in the shopping and the amount of the electronic money spent in the shopping is added to an IC card in an electronic value box 15 installed in the center device 24 of the store.

So far, payment of money for a purchased commodity in a retail-store system having a number of POS terminals and an electronic value box provided in a center device 24 for accommodating a number of IC cards has been explained. In a small store with a system having only one deposit terminal, an IC-card reader/writer for reading and writing information from and to an IC card of a customer is provided for the deposit terminal. By providing an IC card owned by the store in the deposit terminal, payment by electronic money can be made from the IC card of the customer connected to the deposit terminal by way of the IC-card reader/writer to the IC card owned by the store. In addition, as described earlier, electronic money contained in the IC card of the store can be deposited in a bank account or converted into cash at a window of a bank.

In a retail-store system having POS terminals described above, as a way for building a system, an IC card is provided for each POS terminal. Electronic money is exchanged between the IC card of a customer and the IC card of a POS terminal. Then, if necessary, electronic money can be transferred from the IC card of the POS terminal to an IC card in the electronic value box 15 in the center device 24.

If a vending machine 42 is used as a unit participating in the electronic-money system, an IC-card reader/writer 41 is embedded in the vending machine 42 and an IC card is provided for the vending machine 42 itself. In this way, electronic money can be exchanged between an IC card inserted by a customer to the IC-card reader/writer 41 and the IC card provided for the vending machine 42.

<Modifications>

The embodiments described so far implement methods of transaction using electronic money in an automatic teller machine capable of depositing and drawing cash. However, the application of the method of handling an electronic-money card implemented by the embodiments in a transaction to deposit money is not limited to the automatic teller machine described above. The method of handling an electronic-money card in a transaction to deposit money can also be applied to an automatic cash handling machine (or an automatic cash transaction machine) capable of handling transactions to deposit cash such as an automatic cash depository which can handle deposit transactions but not transactions to draw money. The application of the method of handling an electronic-money card implemented by the embodiments in a transaction to withdraw money is not limited to the automatic teller machine described above. The method of handling an electronic-money card in a transaction to withdraw money can also be applied to an automatic cash handling machine (or an automatic cash transaction machine) capable of handling transactions to withdraw cash such as an automatic cash dispenser which can handle withdrawal transactions but not transactions to deposit money. Similarly, the application of the methods of handling an electronic-money card implemented by the embodiments in transactions of making an inquiry about a balance, exchanging money and transferring money is not limited to the automatic teller machine described above. The methods of handling an electronic-money card in the balance-inquiry, money-exchange and money-transfer transactions can also be applied an automatic cash handling machine (or an automatic cash transaction machine) capable of handling at least one of the transactions to deposit and draw money such as an automatic cash depository or an automatic cash dispenser.

As described above, according to the present invention, in an automatic cash handling machine, a transaction wherein at least electronic money is deposited, drawn, exchanged into cash or transferred can be carried out by using an electronic-money card.

What is claimed is:

1. A method for handling electronic money in an automatic cash handling machine which can handle depositing by cash, comprising the steps of:
    (a) designating a financial account to which depositing is to be executed;
    (b) inserting a card containing electronic money;
    (c) designating amount of money to be deposited; and
    (d) executing processing of depositing electronic money within the electronic money contained in the card, to the financial account, based upon the designated amount of money to be deposited.

2. A method for handling electronic money according to claim 1, further comprising step of:
    (e) requesting a user to select cash or electronic money as transaction money;
wherein said step (d) is executed under a condition that electronic money has been selected as transaction money by said user at said step (e).

3. A method for handling electronic money according to claim 1, further comprising a step of:
    (e) requesting a user to select a transaction item;
wherein said step (d) is executed under a condition that an item for depositing money has been selected as a transaction item by said user at said step (e).

4. A method of handling electronic money in an automatic cash handling machine, comprising the steps of:
    (a) inserting into the machine, a cash card which holds account identification information of a financial account;
    (b) inputting a password number;
    (c) inputting withdraw amount of electronic money to be withdrawn from a financial account specified by the account identification information;
    (d) inserting an electronic money card into the machine; and
    (e) storing electronic money of amount corresponding to the inputted withdraw amount into the electronic money card.

5. A method of handling electronic money according to claim 4, further comprising a step of:
    (f) designating cash or electronic money as a kind of money to be withdrawn, thereby causing money of the designated kind of money to be withdrawn.

6. A method of handling electronic money in an automatic cash handling machine, comprising the steps of:
    (a) inserting into the machine, a cash card which holds account identification information of a deposit target financial account;
    (b) inputting cash to be deposited
    (c) accepting the inputted cash;
    (d) executing a process for depositing money of amount corresponding to amount of money of the accepted cash into an account designated by the account identification account held in the cash card;
    (e) inserting an electronic money card into the machine, and inputting deposit amount of money;
    (f) withdrawing from the inserted electronic card, electronic money of amount corresponding to the inputted deposit amount of money; and
    (g) executing a process for depositing money of amount corresponding to the amount corresponding to the inputted amount into an account.

7. A method of handling electronic money in an automatic cash handling machine, comprising the steps of:
    (a) requesting balance check of a financial account, and inserting into the machine, a cash card which holds account identification information of the account;
    (b) inputting a password;
    (c) displaying a balance of the account;
    (d) inserting an electronic money card into the machine and requesting check of the balance;
    (e) reading a balance of electronic money held in the electronic money card therefrom; and
    (f) displaying the read balance.

8. A method of handling electronic money in an automatic cash handling machine which can handle depositing by cash, comprising the steps of:
    (a) inserting a card which can contain electronic money;
    (b) accepting cash; and
    (c) storing electronic money of amount corresponding to amount of the cash, into the card.

9. A method of handling electronic money in an automatic cash handling machine which can handle depositing by cash, comprising the steps of:
    (a) inserting a card which contains electronic money;
    (b) requesting a user to select one of exchange from cash to electronic money and exchange from electronic money to cash:
    (c) selecting exchange from electronic money to cash;
    (d) designating amount of electronic money to be exchanged to cash, within the electronic money contained in the card;
    (e) withdrawing electronic money of amount corresponding to the designated amount of electronic money, from the card; and
    (f) dispensing cash corresponding to the designated amount.

10. A method of handling electronic money in an automatic cash handling machine which can handle depositing by cash, comprising the steps of:
    (a) designating a financial account of a remittee;
    (b) inserting a card which contains electronic money;
    (c) designating amount of money to be transferred to the account electronic money; and
    (d) executing processing of transferring electronic money to the financial account within the electronic money contained in the card, based upon the designated amount of money.

11. A method for handling electronic money in an automatic cash handling machine which can handle depositing by cash, comprising the steps of:
    (a) inserting a card which is for use in cash transaction and stores a financial account to which depositing is to be executed;
    (b) inserting a card containing electronic money;
    (c) designating amount of money to be deposited; and
    (d) executing processing of depositing electronic money within the electronic money contained in the card to said financial account, based upon the designated amount of money to be deposited.

12. A method for handling electronic money according to claim 11, further comprising a step of:

(e) requesting a user to select cash or electronic money as transaction money;

wherein said step (d) is executed under a condition that electronic money has been selected as transaction money by said user at said step (e).

13. A method for handling electronic money according to claim 11, further comprising a step of:

(e) requesting a user to select a transaction item;

wherein said step (d) is executed under a condition that an item for depositing money has been selected as a transaction item by said user at said step (e).

14. A method for handling electronic money in an automatic cash handling machine which can handle depositing by cash, comprising the steps of:

(a) inserting a card which is for use in cash transaction and stores a financial account to which withdrawal is to be executed;

(b) inputting a password number;

(c) inserting a card which can contain electronic money;

(d) designating amount of money to be withdrawn as electronic money; and (e) executing processing of storing electronic money into the card from the financial account, based upon the designated amount of money to be withdrawn.

15. A method for handling electronic money according to claim 14, further comprising a step of:

(f) requesting a user to select cash or electronic money as transaction money;

wherein said step (e) is executed under a condition that electronic money has been selected by said user at said step (f).

16. A method of handling electronic money in an automatic cash handling machine which can handle depositing by cash, comprising the steps of:

(a) inserting a card which can contain electronic money;

(b) requesting display of balance of electronic money; and (c) reading and displaying balance of electronic money contained in the card.

17. A method for handling electronic money according to claim 10, further comprising a step of:

(e) requesting a user to select cash or electronic money as transaction money;

wherein said step (d) is executed under a condition that electronic money has been selected as transaction money by said user at said step (e).

18. A method for handling electronic money according to claim 10, further comprising a step of:

(e) requesting a user to select a transaction item;

wherein said step (d) is executed under a condition that an item for transfer of money has been selected as a transaction item by said user at said step (e).

* * * * *